United States Patent
Hirata et al.

(10) Patent No.: US 10,942,353 B2
(45) Date of Patent: *Mar. 9, 2021

(54) INFORMATION DISPLAY DEVICE

(71) Applicants: MAXELL, LTD., Kyoto (JP);
HITACHI INDUSTRY & CONTROL SOLUTIONS, LTD., Hitachi (JP)

(72) Inventors: Koji Hirata, Kyoto (JP); Masahiko Yatsu, Kyoto (JP); Toshinori Sugiyama, Kyoto (JP); Hiroyuki Kajikawa, Kyoto (JP); Kazuomi Kaneko, Kyoto (JP)

(73) Assignees: MAXELL, LTD., Kyoto (JP);
HITACHI INDUSTRY & CONTROL SOLUTIONS, LTD., Ibaraki (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/837,207

(22) Filed: Apr. 1, 2020

(65) Prior Publication Data
US 2020/0249479 A1 Aug. 6, 2020

Related U.S. Application Data

(63) Continuation of application No. 15/768,840, filed as application No. PCT/JP2015/080156 on Oct. 27, 2015, now Pat. No. 10,670,864.

(51) Int. Cl.
*G02B 27/01* (2006.01)
*B60K 35/00* (2006.01)
(Continued)

(52) U.S. Cl.
CPC .......... *G02B 27/0101* (2013.01); *B60K 35/00* (2013.01); *G02B 5/3025* (2013.01);
(Continued)

(58) Field of Classification Search
CPC .... G02B 27/01; G02B 2027/01; G02B 27/09; G02B 5/30; G02B 27/286; G02B 27/283;
(Continued)

(56) References Cited

U.S. PATENT DOCUMENTS

| 5,760,931 A | 6/1998 | Saburi et al. |
| 2003/0202161 A1 | 10/2003 | Konno et al. |

(Continued)

FOREIGN PATENT DOCUMENTS

| JP | 05-341226 A | 12/1993 |
| JP | 2004-168230 A | 6/2004 |

(Continued)

OTHER PUBLICATIONS

International Search Report of PCT/JP2015/080156 dated Jan. 19, 2016.

*Primary Examiner* — Michelle M Iacoletti
*Assistant Examiner* — Danell L Owens
(74) *Attorney, Agent, or Firm* — Mattingly & Malur, PC

(57) ABSTRACT

Provided is a small-sized information display device displaying video image information as a virtual image by use of an eyepiece optical system including a concave mirror having desired reflection characteristics in a specific polarization direction, where a liquid crystal display panel is used as a video image light source. The information display device has a liquid crystal display panel as a flat display forming video image information disposed therein, and includes a virtual image optical system including a member to be projected for displaying virtual images in front of a vehicle by making a video image displayed on the liquid crystal display panel reflect on the member to be projected. The virtual image optical system includes a concave mirror, and a reflective film of the concave mirror has desired reflection characteristics in a specific polarization direction, so that virtual images having uniform brightness and chromaticity can be obtained.

8 Claims, 20 Drawing Sheets

(51) Int. Cl.
*G02B 17/08* (2006.01)
*G02B 27/28* (2006.01)
*G02B 5/30* (2006.01)
*G06F 3/01* (2006.01)
*G02B 27/09* (2006.01)

(52) U.S. Cl.
CPC ......... *G02B 17/08* (2013.01); *G02B 27/0955* (2013.01); *G02B 27/0983* (2013.01); *G02B 27/283* (2013.01); *G02B 27/286* (2013.01); *G06F 3/013* (2013.01); *B60K 2370/1529* (2019.05); *B60K 2370/23* (2019.05); *B60K 2370/25* (2019.05); *B60K 2370/334* (2019.05); *G02B 2027/011* (2013.01); *G02B 2027/0145* (2013.01); *G02B 2027/0185* (2013.01)

(58) Field of Classification Search
CPC ....... G06F 3/01; B60K 2350/20; B60K 35/00; B60K 2370/23; B60K 2370/1529; B60K 2370/334
See application file for complete search history.

(56) References Cited

U.S. PATENT DOCUMENTS

| | | | |
|---|---|---|---|
| 2005/0012682 A1* | 1/2005 | Jenson | G02B 27/0101 345/7 |
| 2005/0231599 A1 | 10/2005 | Yamasaki | |
| 2007/0103747 A1 | 5/2007 | Powell et al. | |
| 2007/0275752 A1* | 11/2007 | Noba | H04M 1/0272 455/550.1 |
| 2009/0147080 A1 | 6/2009 | Inada | |
| 2010/0193010 A1 | 8/2010 | Wells | |
| 2011/0193814 A1* | 8/2011 | Gay | G02B 30/25 345/173 |
| 2014/0036374 A1 | 2/2014 | Lescure et al. | |
| 2014/0176862 A1* | 6/2014 | Uehara | G02B 6/06 349/62 |
| 2014/0177040 A1 | 6/2014 | Uehara | |
| 2015/0334269 A1 | 11/2015 | Yokota et al. | |
| 2016/0033760 A1 | 2/2016 | Sugimoto | |
| 2016/0163108 A1* | 6/2016 | Kim | G06F 3/013 345/633 |
| 2016/0178902 A1* | 6/2016 | Ando | B60R 1/00 348/115 |
| 2016/0320619 A1 | 11/2016 | Watanabe | |
| 2017/0242248 A1 | 8/2017 | Kuzuhara et al. | |
| 2018/0045958 A1 | 2/2018 | Kuzuhara et al. | |

FOREIGN PATENT DOCUMENTS

| | | |
|---|---|---|
| JP | 2008-026592 A | 2/2008 |
| JP | 2009-229552 A | 10/2009 |
| JP | 2014-123076 A | 7/2014 |
| JP | 2014-126716 A | 7/2014 |
| JP | 2015-034919 A | 2/2015 |
| WO | 94/14098 A1 | 6/1994 |
| WO | 2014/203534 A1 | 12/2014 |

\* cited by examiner

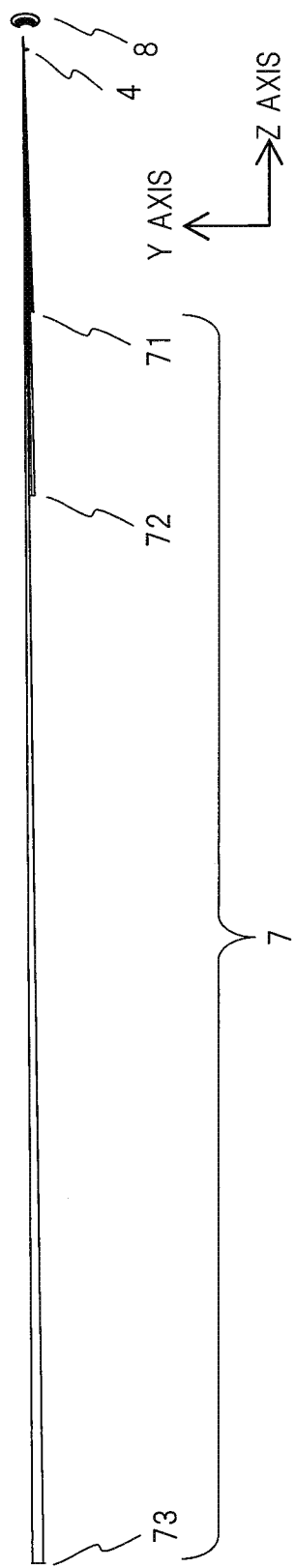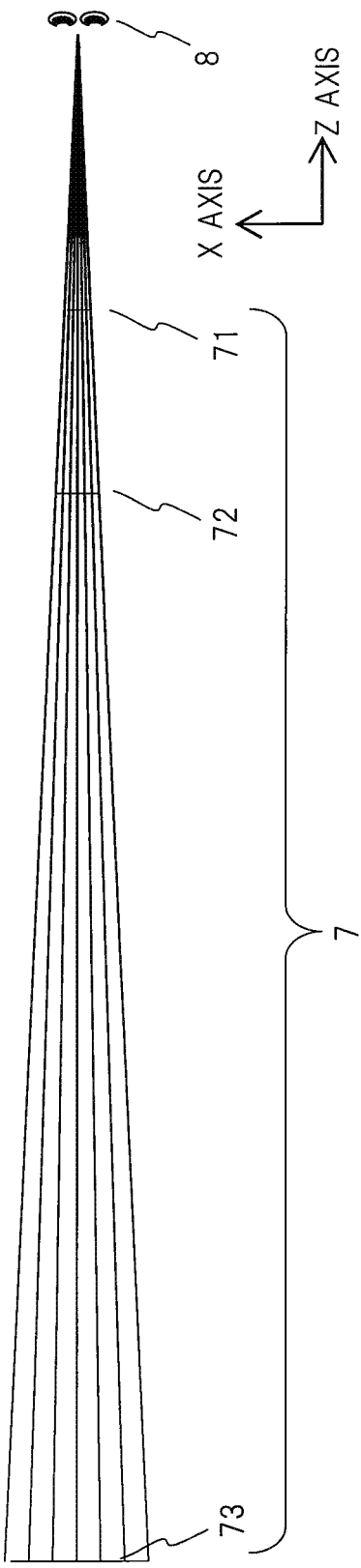
FIG. 15

INFORMATION DISPLAY DEVICE

TECHNICAL FIELD

The present invention relates to an information display device which projects an image onto a windshield of an automobile, a train, and an airplane (hereinafter, generally referred to as "vehicle"), and relates to a virtual image optical system in which the image is observed as a virtual image through the windshield and relates to an information display device using the virtual image optical system.

BACKGROUND ART

A so-called head-up display (HUD) device which projects video image light onto a windshield of an automobile to form a virtual image and which displays traffic information such as route information and traffic jam information, and automobile information such as a fuel level and a cooling water temperature has already been known by Patent Document 1 described below.

In this type of information display device, it has been required that virtual images are respectively formed at a plurality of positions according to a visually recognized position of a driver, in other words, a distance of forming the virtual image is adjusted to the visually recognized position of the driver in order for the driver to easily recognize the information. Thus, as also disclosed in Patent Document 2 described below, for example, the images are formed far (at a long distance) and near (at a short distance) from the driver.

RELATED ART DOCUMENTS

Patent Documents

Patent Document 1: Japanese Patent Application Laid-Open Publication No. 2009-229552
Patent Document 2: Japanese Patent Application Laid-Open Publication No. 2015-34919

SUMMARY OF THE INVENTION

Problems to be Solved by the Invention

In the example of the head-up display device disclosed in Patent Document 1, the video image light displayed on a liquid crystal display panel is mapped as a real image (Ir in FIG. 2 of Patent Document 1) by a relay optical system, and a virtual image (Iv in the same drawing) is observed through an eyepiece optical system (L1 in the same drawing). To organize with a mapping relation, the video image light (a plane) on the liquid crystal display panel is mapped to the real image Ir (a plane), and the real image Ir (the plane) is mapped to the virtual image Iv (a plane).

However, a foreground of the driver is not a two-dimensional plane but a three-dimensional space. Then, with reference to FIG. 22, a line-of-sight direction from the driver in the automobile (subject vehicle) and a distance to an end of the line-of-sight direction will be described.

In a field-of-view range as a foreground viewed by the driver of a subject vehicle 101, there exist a preceding vehicle 102 running ahead, a road surface 105 (for example, whether there is no falling object on the road surface) just in front of the subject vehicle 101, a bicycle running near an edge of the road, and a pedestrian on a sidewalk, and the like.

A line-of-sight direction 103 in which the driver views the preceding vehicle 102 running in front is a direction in which a line of sight is slightly lowered from a direction right in front. A line-of-sight direction 104 in which the driver views the road surface 105 in front of the preceding vehicle 102 on the road is a direction in which the line of sight is further lowered. In this way, it becomes clear that an object which the driver is to pay attention to in driving is different in distance from the driver to the object depending on the line-of-sight direction.

Therefore, in order to further improve driving safety of the automobile, it is important to shorten time taken for focusing the eye by bringing a distance from the driver to an object which the driver is watching in driving and a distance from the driver to the virtual image displayed at that time closer to each other.

In addition, in the example of the head mount display device disclosed in Patent Document 2 described above, virtual images are respectively formed at different distances from the driver. Specifically, a screen is selected according to a display content, and focusing with a variable focus lens is essentially performed at a high speed in accordance with the selected screen. Therefore, "a liquid lens which changes a liquid interface of liquid sealed in a container" or "a concave mirror having a changeable curvature" is used as the variable focus lens, and thus, the head mount display device is increased in size and cost.

In addition, in a case where there are a plurality of viewpoint positions of the driver, respective center positions between a curvature radius of the windshield in a vertical direction of a vehicle body and a curvature radius of the windshield in a horizontal direction of the vehicle body are different from the position of the eye of the driver on a reflection surface of the windshield serving as a member to be projected (6). Therefore, a distortion occurs in a displayed image, and such problem has not been considered at all.

As described above, in the conventional information display device described above, it has been difficult to prevent the device configuration from being increased in size and complicated, and to respectively form virtual images at different viewpoint positions (distances) of the driver. Further, distortion occurs depending on the viewpoint position of the driver even in a displayed video image, and such problem has not been considered at all.

Then, the present invention has been made in view of the problems of the above-described conventional techniques, and more specifically, an object thereof is to provide an information display device capable of forming virtual images having high visibility even at different viewpoint positions (distances) from the driver while preventing the device from being increased in size and complicated.

Means for Solving the Problems

The present invention achieved to attain the above object is, by way of example, an information display device displaying video image information of a virtual image on a windshield of a vehicle, the information display device including: a liquid crystal display panel displaying the video image information; and a virtual image optical system displaying the virtual image in front of the vehicle by reflecting light emitted from the liquid crystal display panel on the windshield, in which the virtual image optical system includes a concave mirror and a plurality of optical elements, the concave mirror includes a reflection surface made of a metal film having a high and uniform spectral reflectance with respect to a visible light, on a front surface of a base material, and the plurality of optical elements are disposed between the liquid crystal display panel and the concave mirror so as to separate a video image light flux to establish each virtual image of a plurality of virtual images such that the plurality of virtual images are respectively established at a plurality of positions corresponding to viewpoint positions of a driver from an upper portion to a lower portion of the windshield.

Effects of the Invention

According to the present invention described above, it is possible to provide an information display device capable of forming virtual images having high visibility even at different viewpoint positions (distances) from the driver while preventing the device from being increased in size and complicated.

BRIEF DESCRIPTIONS OF THE DRAWINGS

Figure 16:
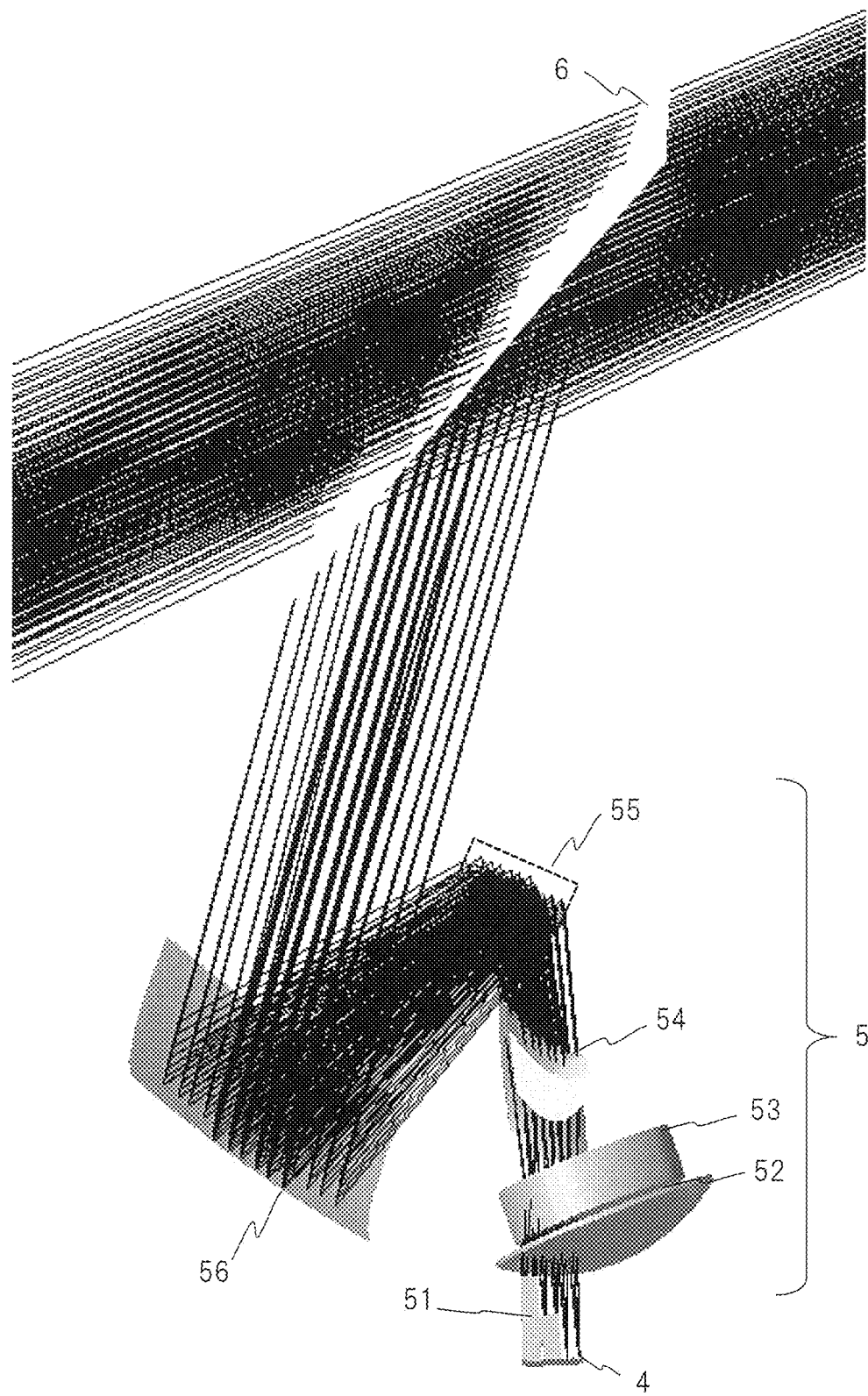
Figure 17:
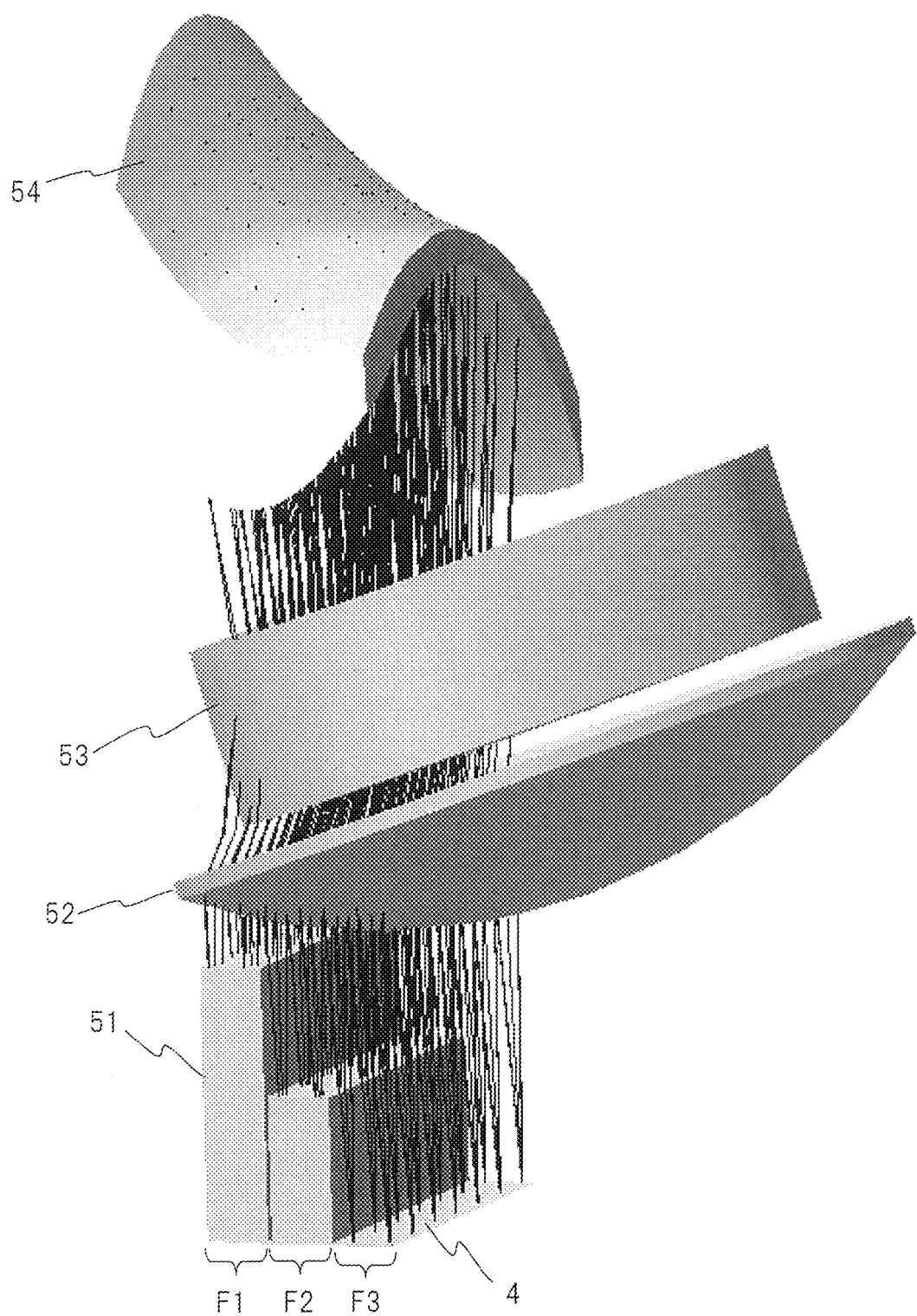
Figure 18:
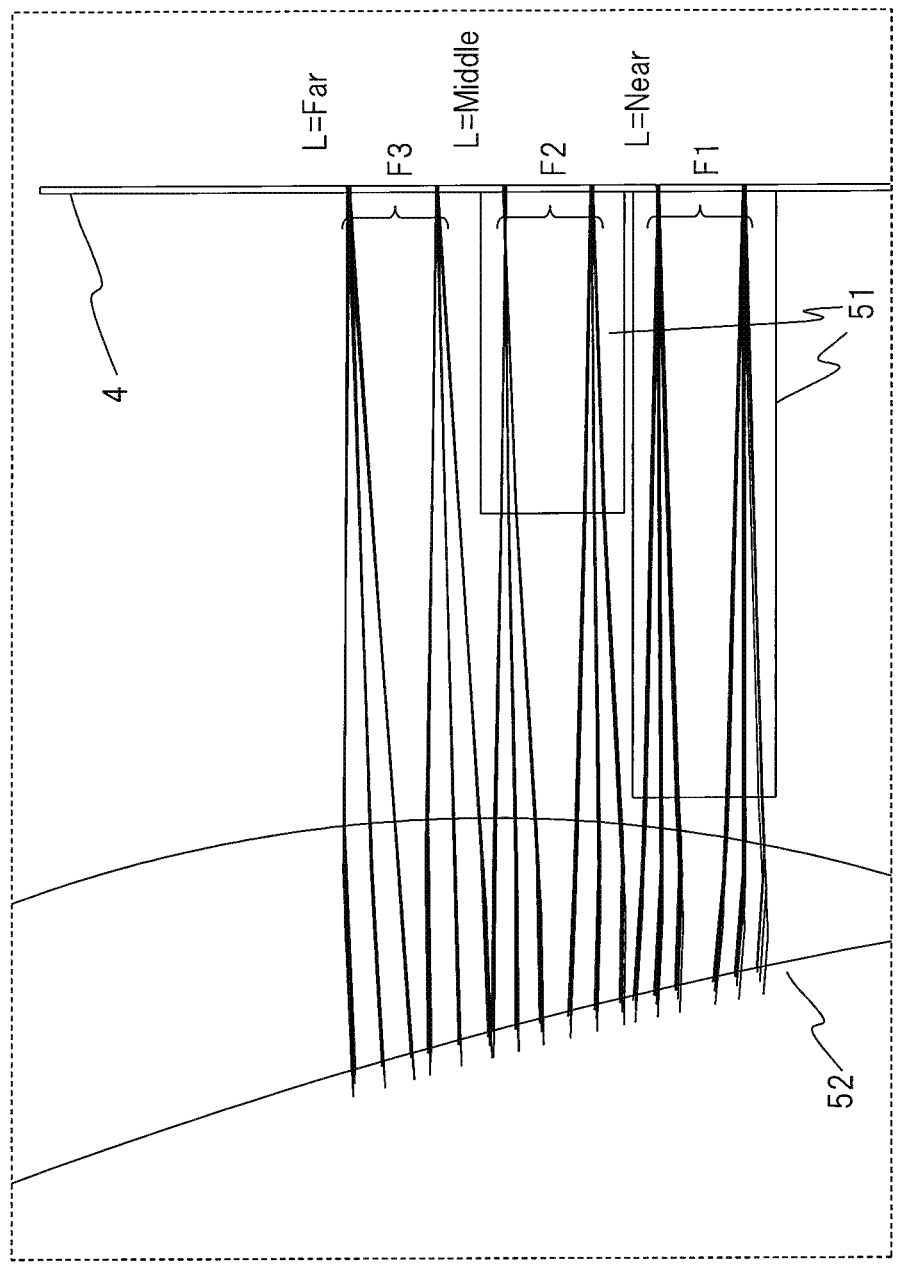
Figure 19:
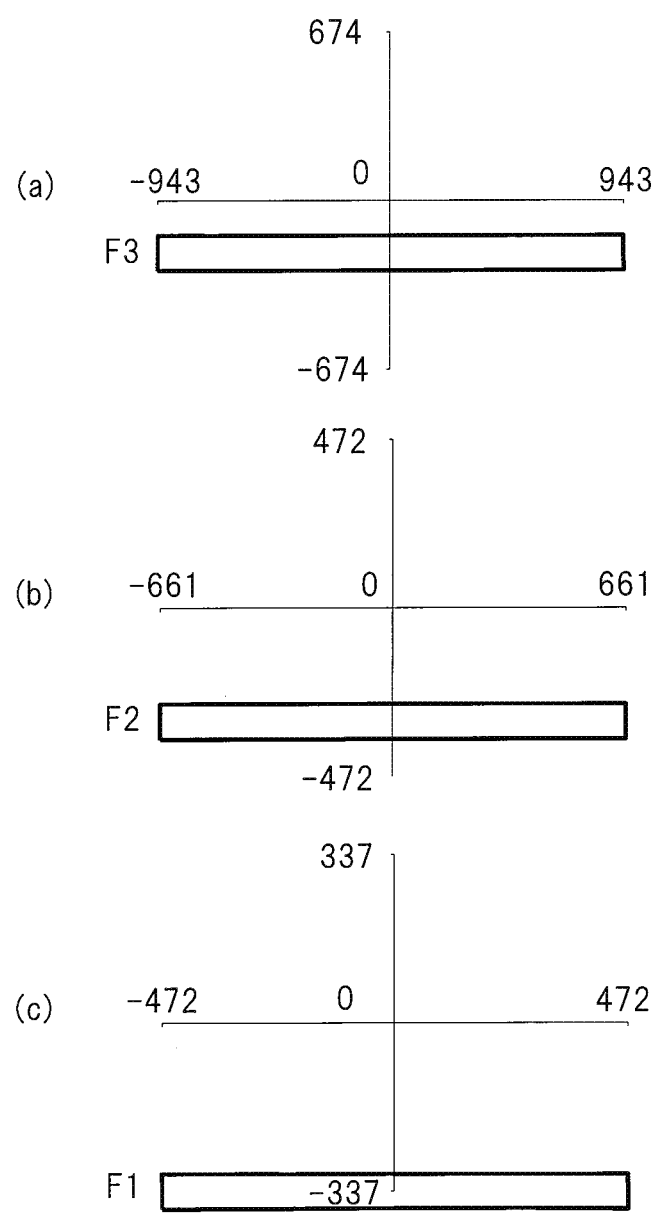
Figure 20:
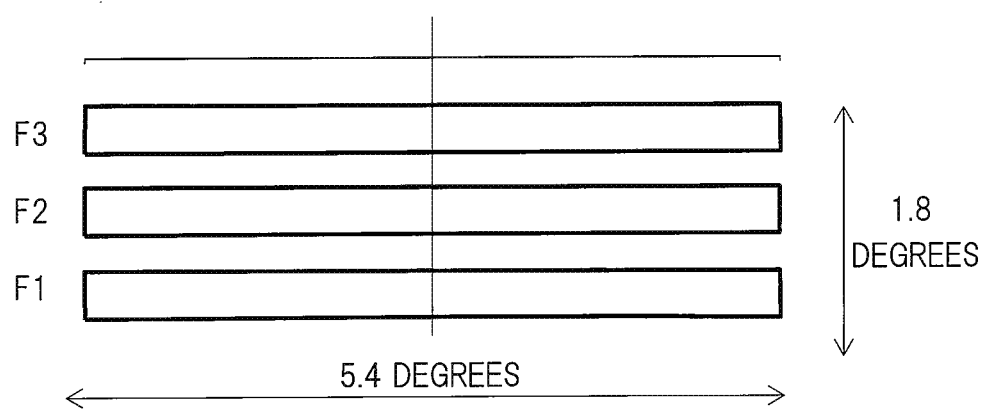
Figure 21:
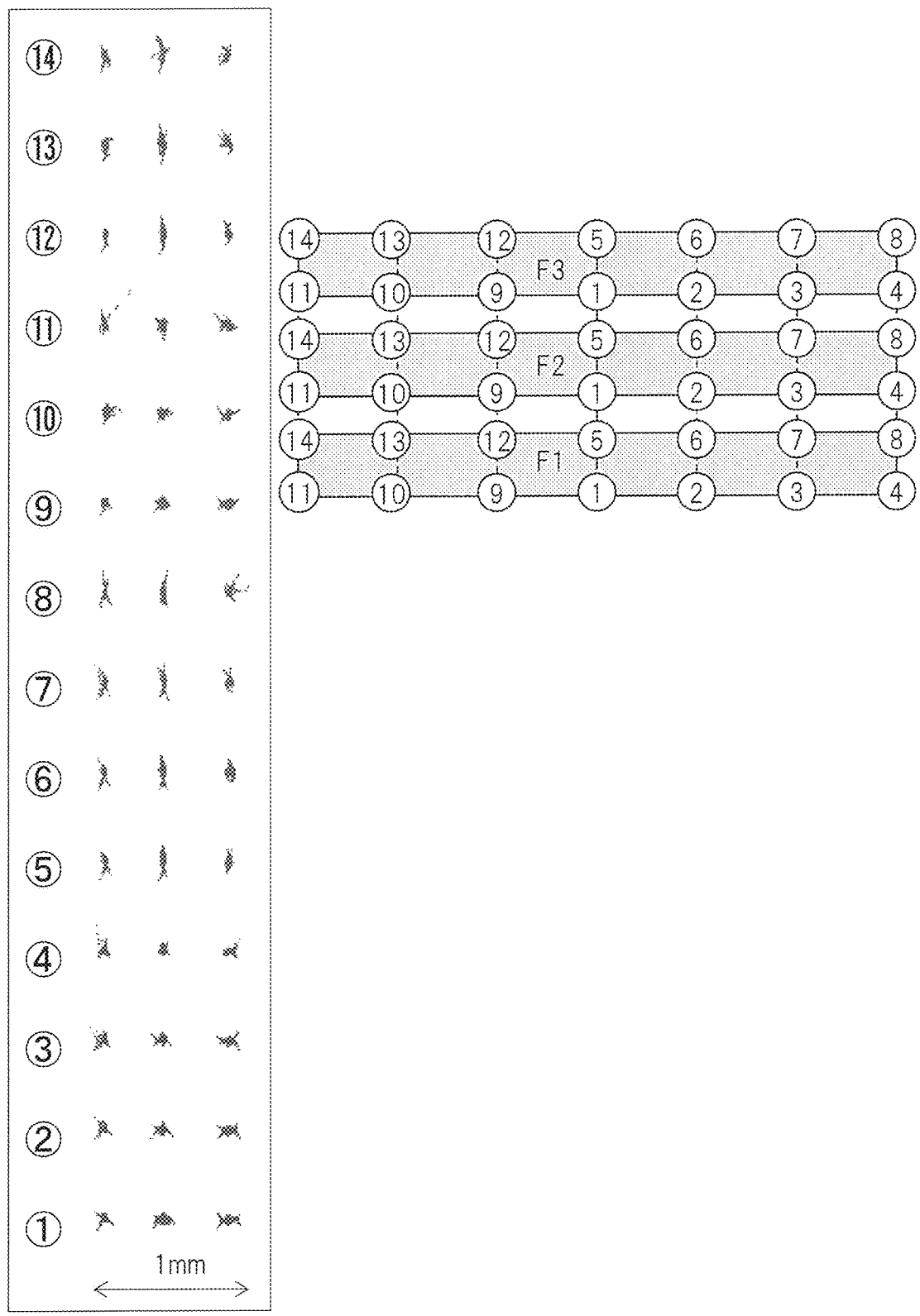
Figure 22:
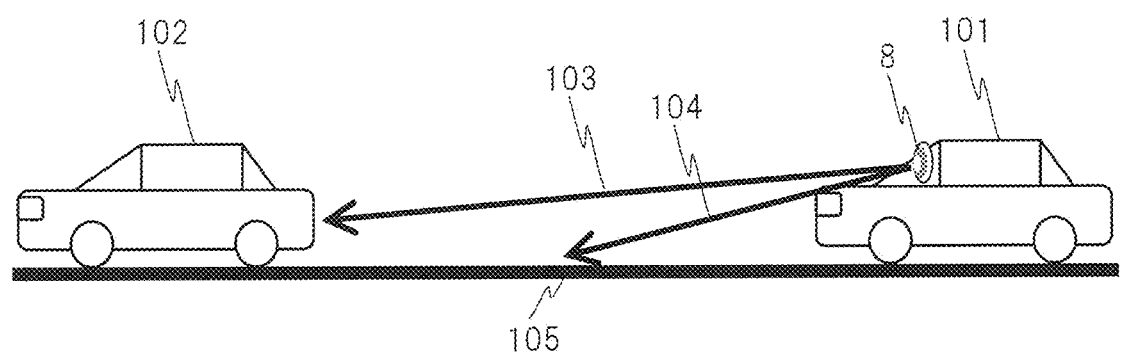
Figure 23:
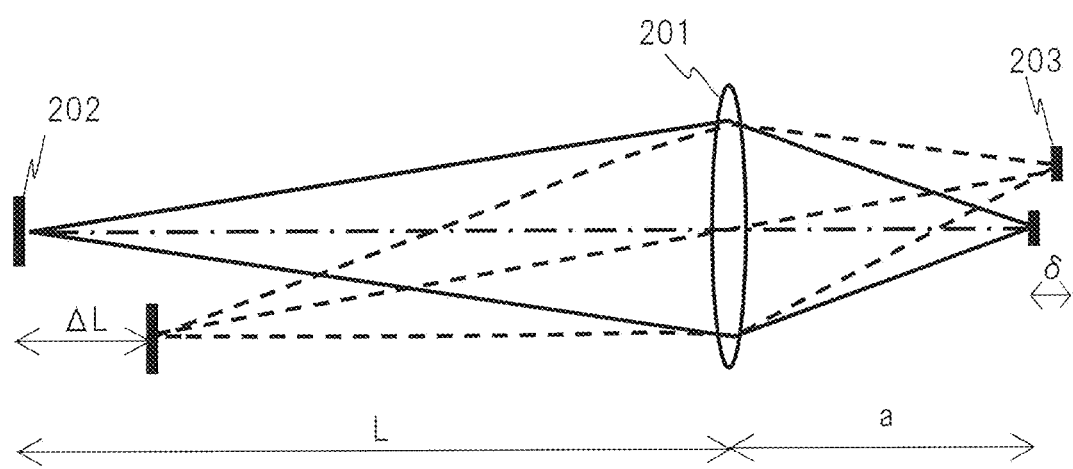
Figure 24:
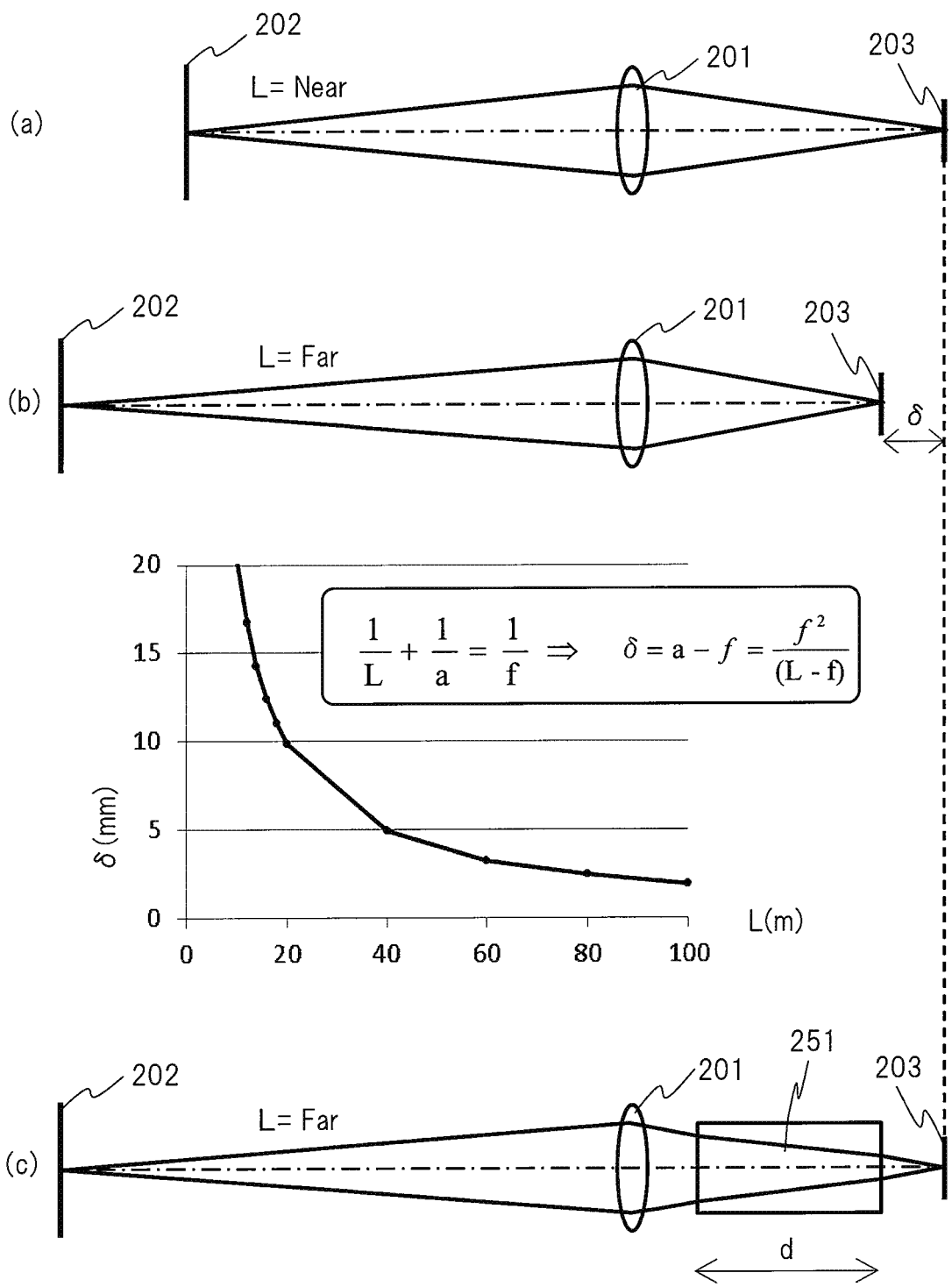
Figure 25:
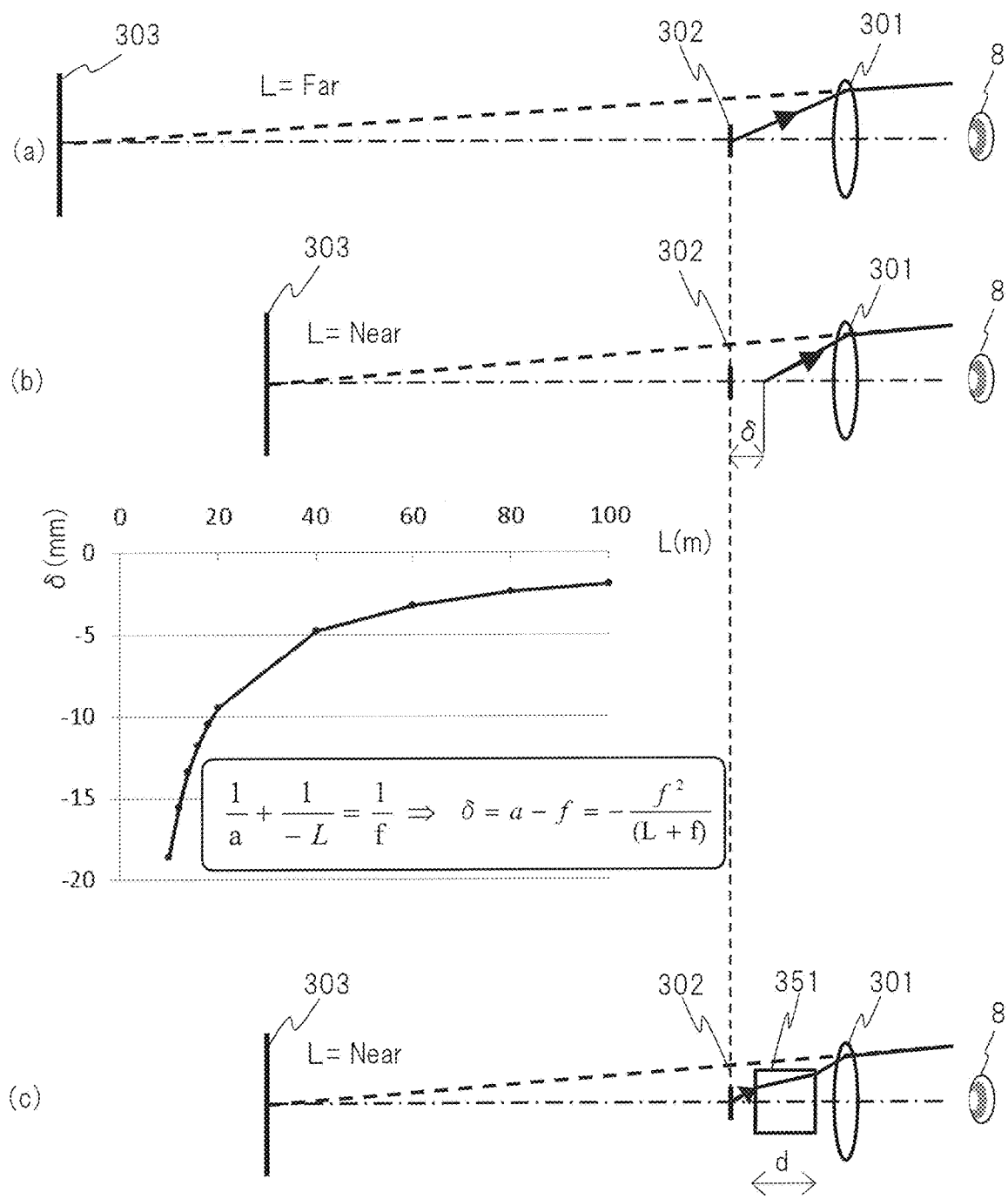

FIG. 15 is a diagram illustrating entire light rays of the virtual image optical system according to a first embodiment of the present invention, where FIG. 15(a) illustrates how video image information on a virtual image plane is viewed with eyes of an observer on a YZ plane, and FIG. 15 (b) illustrates how video image information on a virtual image plane is viewed with the eyes of the observer on an XZ plane;

FIG. 16 is an enlarged perspective view of a principal part of the virtual image optical system according to the first embodiment of the present invention;

FIG. 17 is an enlarged perspective view of a lens portion of an eyepiece optical system constituting the virtual image optical system according to the first embodiment of the present invention;

FIG. 18 is a diagram illustrating a mapping relation on an inclined plane in the first embodiment of the present invention;

FIG. 19 is a diagram illustrating a distortion performance for each separate optical path in the first embodiment of the present invention;

FIG. 20 is a diagram illustrating a distortion performance of an entire eyepiece optical system in the first embodiment of the present invention;

FIG. 21 is a spot diagram of the eyepiece optical system in the first embodiment of the present invention;

FIG. 22 is a diagram illustrating line-of-sight directions of a driver and a difference in distance therebetween in a conventional technique;

FIG. 23 is a diagram illustrating a mapping relation between an object distance and an image distance;

FIG. 24 is a diagram illustrating a mapping relation in a real image optical system and a function of a stepped filter; and FIG. 25 is a diagram illustrating a mapping relation in a virtual image optical system and a function of a stepped filter.

DETAILED DESCRIPTION OF PREFERRED EMBODIMENTS

In the following, one embodiment and various kinds of examples of the present invention will be described with reference to the drawings and the like. Note that the following description indicates specific examples of contents of the present invention, and the present invention is not limited to this description. Various modifications and alterations can be made by those skilled in the art within the scope of the technical idea disclosed in the present specification. In addition, components having the same function are denoted by the same reference characters throughout the drawings for describing the present invention, and the repetitive description thereof may be omitted.

<Embodiment of Information Display Device>

Figure 1:
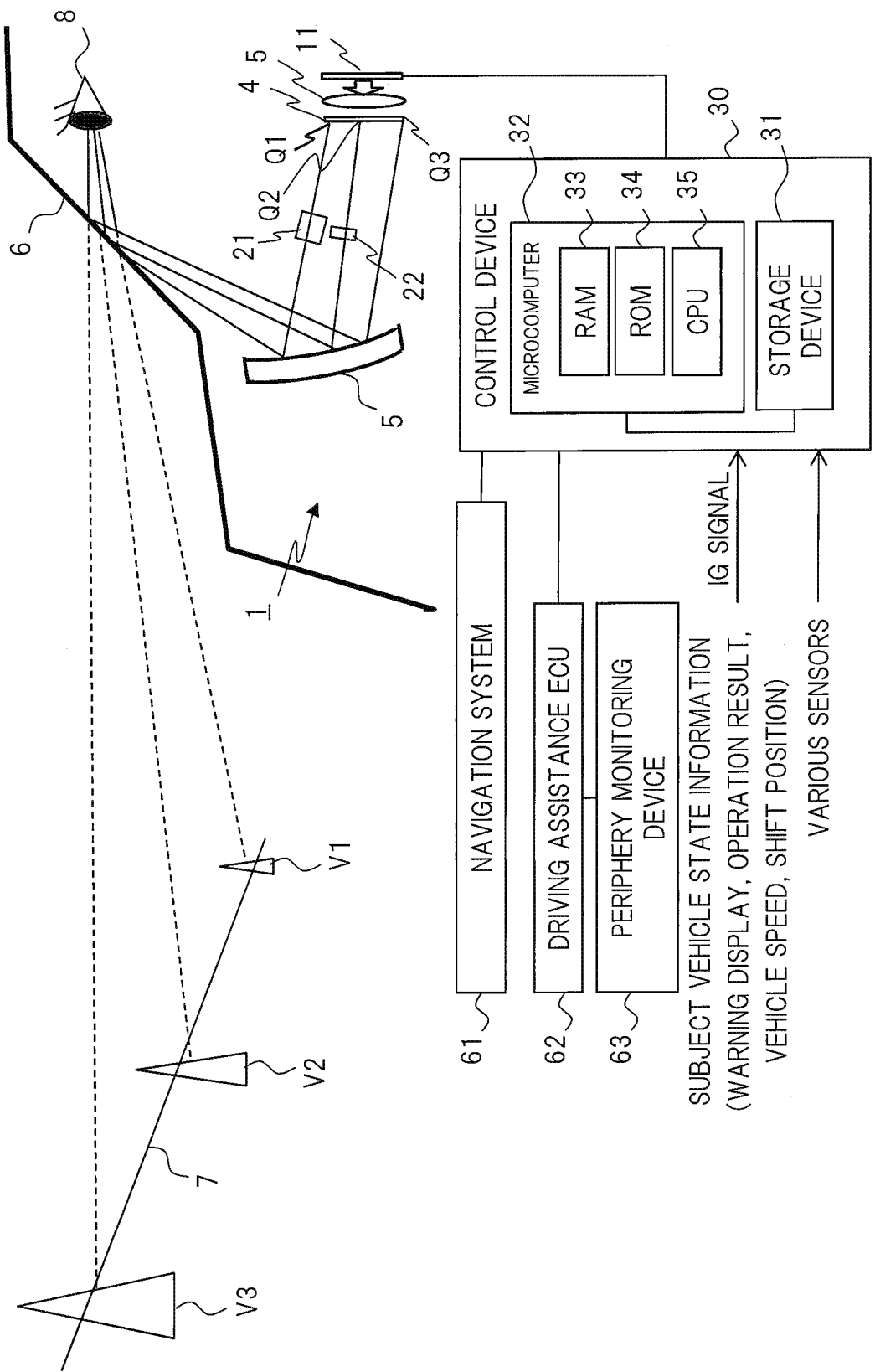
FIG. 1 is a schematic configuration diagram illustrating schematic configurations of an information display device according to one embodiment of the present invention and peripheral equipment disposed in the information display device.

FIG. 1 is a block diagram of a configuration of peripheral equipment of the information display device 1 according to one embodiment of the present invention and a schematic configuration diagram of the information display device 1. Herein, by way of example, description will be given particularly regarding an information display device which projects an image onto a windshield of an automobile.

The information display device 1 is a device (so-called HUD (head-up display)) which displays various types of information reflected on a member to be projected 6 (the windshield in this embodiment) as virtual images V1 (Virtual Image) in order to form virtual images V1 to V3 at a plurality of positions, respectively, in a line of sight 8 of a driver in front of a subject vehicle. Note that the member to be projected 6 may be a member on which information is projected and may be not only the above-described windshield but also a combiner, for example. In other words, in the information display device 1 of this embodiment, the virtual images are formed at the plurality of positions, respectively, in the line of sight 8 of the driver in front of the subject vehicle such that the driver can recognize the virtual images. Examples of the information to be displayed as the virtual image include vehicle information and foreground information captured by a camera such as a monitoring camera or an around view camera (not illustrated).

In addition, the information display device 1 includes a video image projection device 11 which projects a video image light indicating information, an intermediate-image forming section 4 which forms an image of light from the video image projection device 11, an optical component 5 which converges or diverges video image information (video image light) formed in the intermediate-image forming section 4, and a control device 40 which controls the video image projection device 11. Note that the above optical component 5 is a virtual image optical system to be described below and includes a concave mirror on which light is reflected. In addition, the light reflected on the optical component 5 is reflected on the member to be projected 6 and directed toward the line of sight 8 of the driver (EyeBox: described later).

The above intermediate-image forming (or, intermediate-image display) section 4 has a function of forming an image of light from the video image projection device 11 and includes a microlens array in which micro lenses are two-dimensionally disposed, for example. In this embodiment, an optical element 21 and an optical element 22 are disposed between the intermediate-image forming section 4 and the optical component 5 composed of the concave reflection mirror constituting an eyepiece optical system. A first purpose of a layout of the optical element 21 and the optical element 22 is to set formation positions of virtual images at a plurality of places (three places in this embodiment) in front of the subject vehicle. Further, a second purpose is to perform aberration correction at each of the positions where the video image light from the intermediate-image forming section 4 is separated between the intermediate-image forming section 4 and the optical component 5 constituting the eyepiece optical system. Note that, according to the aberration correction by these optical elements, even when the virtual images are formed at different positions, using the same virtual image optical system enables the plurality of virtual images to be displayed at different magnifications.

More specifically, aberration of light flux forming the virtual image V1 at a closest position is improved by the optical element 21. At the same time, aberration of the virtual image V2 at a middle position is corrected by the optical element 22. In addition, there is no optical element for the virtual image V3 formed at a farthest position because the aberration is optimized by the original virtual image optical system. However, even if an optimally-designed optical element is further provided in order to improve a capability of correcting the aberration, it is needless to say that such a configuration shall not depart from the technical idea or the scope of the present invention.

In addition, in this embodiment, description has been given regarding an example in which a generation position of a virtual image is divided into the far virtual image V3, the middle virtual image V2, and the near virtual image V1, and the optical elements 21 and 22 are provided individually, for the convenience of explanation. However, the present invention is not limited to the above configuration. For example, it is needless to say that a common optical element may be provided to change a spatial optical distance in order to continuously change a display position of a virtual image from a far position to a near position, and to sufficiently reduce aberration such that a position where the virtual image is generated is continuously changed, without departing from the technical thought or the scope of the present invention.

Meanwhile, the control device 30 includes a storage device 31 and a microcomputer 32. The storage device 31 is configured by a non-volatile storage device storage contents of which are rewritable. The microcomputer 32 is mainly constituted by a computer which includes a ROM 34 storing a processing program and data storage contents of which need to be retained even when power is shut off, a RAM 33 temporarily storing the processing program and the data, and a CPU 35 executing various types of processes according to the processing program stored in the ROM 34 and the RAM 33.

Among them, the ROM 34 stores a processing program through which the microcomputer 32 executes an information display process to control the video image projection device 11 such that various types of information such as the vehicle information and the foreground information are projected onto the member to be projected 6. Then, the control device 30 is connected to at least a navigation system 61 and a driving assistance electronic control device (hereinafter, referred to as "driving assistance ECU (Electronic Control Unit)") 62 as an acquisition source of the vehicle information and the foreground information.

The navigation system 61 is a device guiding a route to a set destination according to a result obtained by collating a current position detected by a position detection device with map data stored in a map data storage section. The map data contains various types of information such as a speed limit of a road, the number of lanes, and an intersection.

The control device 30 acquires information such as a speed limit, the number of lanes of a road corresponding to the current position where the subject vehicle runs, and a scheduled movement route of the subject vehicle set in the navigation system 61 as the foreground information (that is, information displayed in front of the subject vehicle by the above-described virtual image) from the navigation system 61.

The driving assistance ECU 62 is a control device controlling a drive system and a control system according to an obstacle detected as a result of monitoring of a periphery monitoring device 63 so as to achieve a driving assistance control. Examples of the driving assistance control include well-known techniques such as cruise control, adaptive cruise control, pre-crush safety, and lane keeping assist.

The periphery monitoring device 63 is a device monitoring a situation of a periphery of the subject vehicle. Examples include a camera which detects an object around the subject vehicle based on a captured image of the periphery of the subject vehicle, or a search device which detects an object around the subject vehicle based on a result obtained by sending and receiving search waves.

The control device 30 acquires the information from the driving assistance ECU 62 (for example, a distance to a preceding vehicle, an orientation of the preceding vehicle, and positions of obstacles and signs) as the foreground information. Further, the control device 30 receives an ignition (IG) signal and subject vehicle state information. Among these pieces of information, the subject vehicle state information is information acquired as the vehicle information and for example, includes warning information indicating an abnormal state which is defined in advance, such as a fuel level of the internal combustion engine and a temperature of cooling water. In addition, information such as an operation result of a direction indicator, a driving speed of the subject vehicle, and a shift position is also included. The control device 30 described above is activated when the ignition signal is input. The foregoing is a description of an entire system of the information display device of the one embodiment of the present invention has been described.

First Embodiment

Next, a virtual image optical system 5 and the video image projection device 11 of the embodiment of the present invention will be described in detail below.

Figure 2:
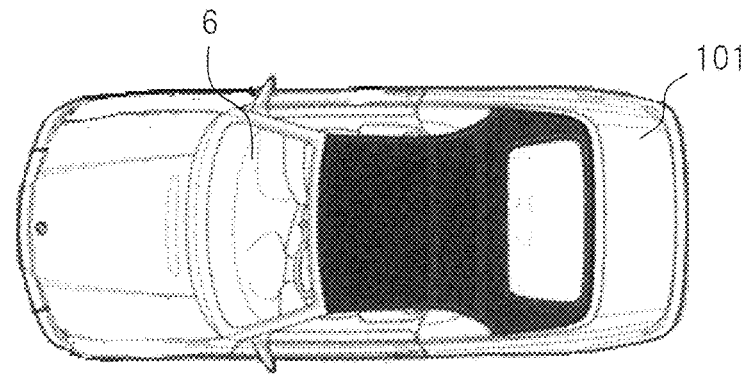
FIG. 2 is a top view of an automobile in which the information display device according to the one embodiment of the present invention is mounted.
Figure 3:
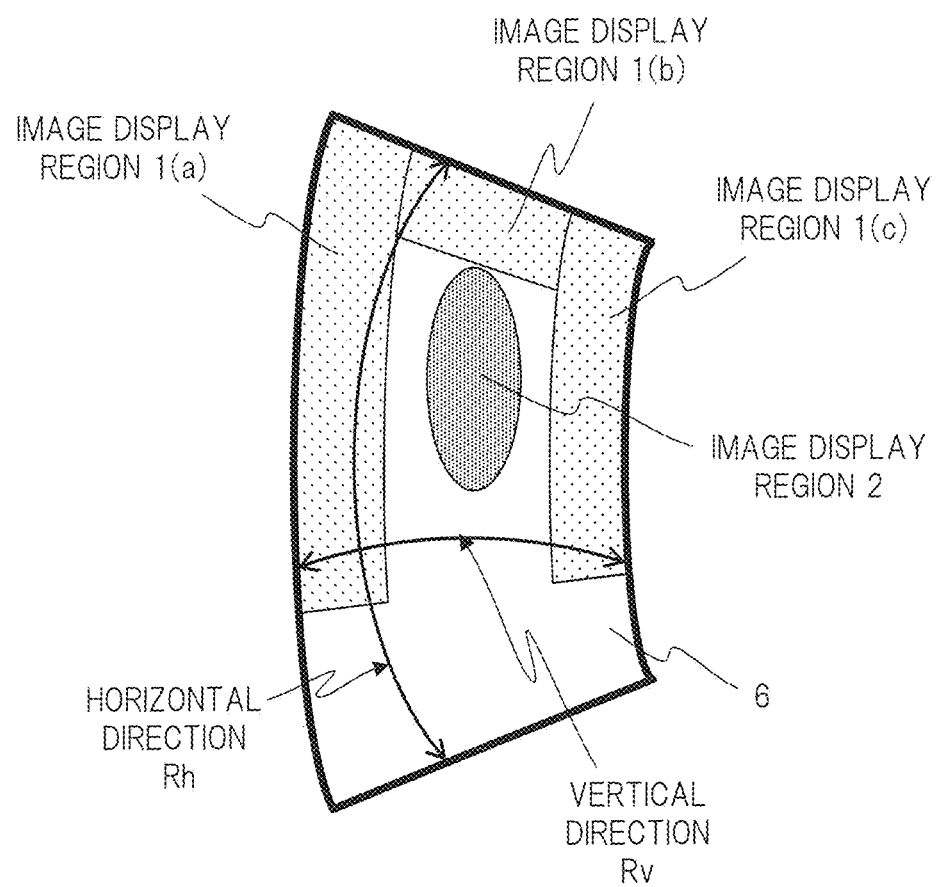
FIG. 3 is a configuration diagram illustrating a difference in curvature radius of a windshield in the one embodiment of the present invention.

FIG. 2 is a top view of an automobile in which the information display device 1 according to the embodiment of the present invention is mounted. A windshield is present as the member to be projected 6 at the front of a driver seat of a automobile body 101. Note that the windshield has different inclined angles with respect to a vehicle body depending on types of automobiles. Furthermore, the present inventors also have investigated a curvature radius of the windshield in order to achieve an optimal virtual image optical system. As a result, the windshield has a curvature radius Rh in a horizontal direction parallel to a ground contact surface of the automobile and a curvature radius Rv in a vertical direction perpendicular to a horizontal axis as illustrated in FIG. 3, which are different from each other. It became clear that the curvature radiuses Rh and Rv generally satisfy the following relation:

Rh>Rv

In addition, it also became clear that this difference in curvature radius (that is, a ratio of Rh to Rv) often falls within a range of 1.5 to 2.5 times.

Next, the present inventors also have investigated the inclined angles of commercial windshields. As a result, while the inclined angles are different depending on vehicle body types, a light automobile and a one-box automobile have a range of 20 to 30 degrees, a sedan automobile has a range of 30 to 40 degrees, and a sports automobile has a range of 40 degrees or more. Therefore, in this embodiment, the virtual image optical system is designed in consideration of a difference between the curvature radius Rh of the windshield in the horizontal direction parallel to the ground contact surface of the automobile and the curvature radius Rv of the windshield in the vertical direction perpendicular to the horizontal axis, and the inclined angle of the windshield.

More specifically, the horizontal curvature radius Rh and the vertical curvature radius Rv of the windshield serving as the member to be projected are significantly different. Thus, an optical element, which is axially asymmetric to an optical axis (Z axis) with respect to a horizontal axis of the windshield and an axis perpendicular to the horizontal axis is provided within the virtual image optical system, and accordingly, favorable aberration correction is achieved. Note that obtained lens data of the virtual image optical system will be described in detail later.

In addition, description will be given below regarding the first embodiment of the virtual image optical system using a free-form surface lens having a rotationally asymmetrical shape capable of achieving an optical system in which an object plane position becomes flush with a plurality of virtual image planes which are different in field-of-view range and virtual image distance, and a free-form surface mirror (describing a free-form surface mirror based on a concave surface in the present specification as an example), as illustrated also in FIG. 1.

With reference to FIG. 15, a configuration of the virtual image optical system which is the first embodiment of the present invention will be described. FIG. 15 is an entire ray diagram of the virtual image optical system 5 illustrated in FIG. 1 according to the first embodiment of the present invention, and particularly, FIG. 15(a) illustrates how video image information on a virtual image plane 7 is viewed with eyes of an observer on a YZ plane, and FIG. 15(b) illustrates how video image information on the virtual image plane 7 is viewed with the eyes of the observer on an XZ plane. On the YZ plane, the right eye overlaps with the left eye (see reference numeral 8). On the XZ plane, the right and the left eyes are illustrated separately.

FIG. 16 is an enlarged perspective view of a principal part of the virtual image optical system 5 according to the first embodiment of the present invention described above. Also, FIG. 17 is an enlarged perspective view of a lens portion of an eyepiece optical system 5a constituting the virtual image optical system 5 according to the first embodiment of the present invention described above. As illustrated in FIG. 16 and FIG. 17, each of a free-form surface lens 54 and a free-form surface mirror 56 is configured to have a rotationally asymmetrical shape. Note that an optical element 51, a convex lens 52, and a concave lens 53 have a large amount of eccentricity (no eccentricity in the front and the rear surfaces). In addition, FIG. 18 is a diagram illustrating a mapping relation on an inclined plane.

As illustrated also in FIG. 16, the virtual image optical system 5 is configured by a stepped filter (optical element) 51, the convex lens 52 having a positive refractive power, the concave lens 53 having a negative refractive power, the rotationally asymmetrical free-form surface lens 54, a cylinder mirror 55, the rotationally asymmetrical free-form surface mirror 56, and a windshield 6 disposed in this order from the intermediate-image display section (or an image display section such as a flat display) 4. Difference between the curvature radius in the horizontal direction and the curvature radius in the vertical direction of the windshield 6 is canceled by adding the cylinder mirror 55. Further, the free-form surface mirror 56 having a rotationally asymmetric reflection surface corrects distortion of a virtual image.

Herein, the obtained lens data in the virtual image optical system 5 of the first embodiment described above are indicated in the following Tables 1 and 2.

TABLE 1

| Name | Plane No. | Shape | Curvature radius | Inter-plane distance | Glass material | Contents of eccentricity/tilt | Eccentricity (mm) X axis | Eccentricity (mm) Y axis | Tilt (degree) Around X axis | Tilt (degree) Around Y axis | Tilt (degree) Around Z axis |
|---|---|---|---|---|---|---|---|---|---|---|---|
| Virtual image plane | 0-plane | Planar | ∞ | 18000·X· | | | | | | | |
| Incident pupil | 1-plane | Planar | ∞ | −680 | | | 0 | 0 | 0 | 0 | |
| Windshield | 2-plane | Anamorphic aspherical | 9686 5531 | 0 | Reflection | Decanter & Return | −340 | −1959 | −43.7 | 0 | 0 |
| Dummy plane | 3-plane | Planar | ∞ | 312.017 | | Normal eccentricity | 0 | 0 | −130.695 | 6.321 | 0 |
| Mirror | 4-plane | Free-form | ∞ | 0 | Reflection | Decanter & Return | 0 | 0 | −14.596 | −3.175 | −1.652 |
| Dummy plane | 5-plane | Planar | ∞ | −140.110 | | Normal eccentricity | 0 | 0 | −40.493 | −0.922 | 0 |
| Mirror | 6-plane | Cylindrical (Y) | −470.077 | 0.000 | Reflection | Decanter & Return | 0 | 0 | 42.550 | 2.278 | 5.284 |
| Dummy plane | 7-plane | | ∞ | 50.755 | | Normal eccentricity | 0 | 0 | 85.587 | 23.818 | 0 |
| L1 | 8-plane | Free-form | ∞ | 0.00348981 | 'PMMA25' | Normal eccentricity | 0 | 0 | −17.383 | 2.021 | −8.821 |
| | 9-plane | Free-form | ∞ | 45.108 | | | 0 | 0 | 0 | 0 | 0 |
| L2 | 10-plane | Spherical | −40.872 | 3 | BACED5_HOYA | Normal eccentricity | 15.906 | −22.720 | 13.162 | −9.329 | 0 |
| | 11-plane | Spherical | −836.157 | 5.399 | | | 0 | 0 | 0 | 0 | 0 |
| L3 | 12-plane | Spherical | −261.342 | 12 | EFDS1_HOYA | | 0 | 0 | 0 | 0 | 0 |
| | 13-plane | Spherical | −69.127 | −3.438 | | | 0 | 0 | 0 | 0 | 0 |
| Dummy plane | 14-plane | Spherical | ∞ | 0.000·X· | | Normal eccentricity | −0.144 | −24.454 | −18.169 | −2.653 | 4.871 |
| Stepped filter | 15-plane | Spherical | ∞ | 27.439·X· | BSC7_HOYA | | 0 | 0 | 0 | 0 | 0 |
| | 16-plane | Spherical | ∞ | 0 | | | 0 | 0 | 0 | 0 | 0 |
| | 17-plane | Spherical | ∞ | 0 | | | 0 | 0 | 0 | 0 | 0 |
| | 18-plane | Spherical | ∞ | 0 | | | 0 | 0 | 0 | 0 | 0 |
| Base material of diffusion plate | 19-plane | Planar | ∞ | 0.3 | 58.30 | | 0 | 0 | 0 | 0 | 0 |
| | 20-plane | Planar | ∞ | 0 | Base material PC film | | 0 | 0 | 0 | 0 | 0 |
| Intermediate image | 21-plane | Planar | ∞ | 0 | | | 0 | 0 | 0 | 0 | 0 |

| Virtual image distance | Inter-plane distance 14-plane | Inter-plane distance 15-plane |
|---|---|---|
| 18000 | 0 | 27.439 |
| 30000 | 12.883 | 14.556 |
| 100000 | 27.439 | 0 |

TABLE 2

| Code | | Mirror plane (4-plane) | L1A plane (8-plane) | L1B plane (9-plane) |
|---|---|---|---|---|
| R | 1/c | ∞ | ∞ | ∞ |
| K | k | | | |
| C2 | X | −3.22002E−02 | 4.54074E−02 | 2.55203E−02 |
| C3 | Y | −8.29603E−03 | −1.76329E−01 | −3.03864E−01 |
| C4 | $X^2$ | −1.03157E−03 | 6.07824E−03 | 7.53664E−03 |
| C5 | XY | 3.92761E−05 | 2.65621E−03 | 5.97633E−03 |
| C6 | $Y^2$ | −1.10066E−03 | −6.59897E−03 | −4.47067E−03 |
| C7 | $X^3$ | −1.91066E−08 | −2.96949E−05 | −3.45143E−05 |
| C8 | $X^2Y$ | −6.12520E−07 | −1.00245E−04 | −2.66099E−04 |
| C9 | $XY^2$ | −1.12579E−07 | −1.17043E−04 | −2.92245E−05 |
| C10 | $Y^3$ | −1.07634E−07 | 1.05709E−04 | 3.16314E−04 |
| C11 | $X^4$ | 7.89875E−10 | −5.15580E−06 | −5.61519E−06 |
| C12 | $X^3Y$ | 2.17486E−09 | 1.90246E−06 | 5.96665E−07 |
| C13 | $X^2Y^2$ | −5.36548E−10 | 4.86696E−06 | 4.13535E−06 |
| C14 | $XY^3$ | 1.33541E−09 | 4.46461E−08 | 2.77050E−08 |
| C15 | $Y^4$ | −2.13150E−09 | 5.81526E−06 | 1.61022E−05 |
| C16 | $X^5$ | 3.34679E−12 | 1.13247E−07 | 2.28361E−07 |
| C17 | $X^4Y$ | −2.94088E−12 | −2.15118E−07 | −1.45299E−07 |
| C18 | $X^3Y^2$ | 2.51633E−12 | 7.79406E−09 | −1.30621E−07 |
| C19 | $X^2Y^3$ | −3.87701E−11 | −4.44829E−08 | 7.15801E−08 |
| C20 | $XY^4$ | 1.76966E−11 | 3.20822E−08 | 2.04991E−09 |
| C21 | $Y^5$ | −3.44091E−11 | 4.57619E−07 | 5.40985E−07 |
| C22 | $X^6$ | −1.08236E−14 | −1.69575E−09 | −5.17032E−09 |
| C23 | $X^5Y$ | −1.29734E−13 | 1.68661E−09 | 2.98111E−09 |
| C24 | $X^4Y^2$ | −8.30366E−14 | 3.04029E−09 | 7.71212E−09 |
| C25 | $X^3Y^3$ | −1.22821E−13 | 4.36565E−10 | 4.71962E−10 |
| C26 | $X^2Y^4$ | 3.14237E−13 | −1.75490E−09 | 1.90722E−09 |
| C27 | $XY^5$ | −3.73084E−13 | −3.96351E−10 | −4.46001E−10 |
| C28 | $Y^6$ | 4.52998E−13 | 7.02316E−09 | 5.00733E−09 |
| C29 | $X^7$ | −1.76226E−16 | 2.93875E−12 | 1.61555E−11 |
| C30 | $X^6Y$ | 8.25919E−16 | −4.03795E−11 | −6.76333E−11 |
| C31 | $X^5Y^2$ | 1.69287E−16 | −1.61726E−11 | −1.59265E−10 |

TABLE 2-continued

| Code | | Mirror plane (4-plane) | L1A plane (8-plane) | L1B plane (9-plane) |
|---|---|---|---|---|
| C32 | $X^4Y^3$ | 2.87705E−15 | 1.20090E−10 | 6.25989E−11 |
| C33 | $X^3Y^4$ | −5.11558E−15 | 2.51934E−11 | 5.14224E−11 |
| C34 | $X^2Y^5$ | 7.93551E−15 | 2.18795E−10 | 1.94413E−10 |
| C35 | $XY^6$ | −6.87888E−15 | 1.39011E−11 | 1.45325E−11 |
| C36 | $Y^7$ | 5.89554E−15 | −6.44596E−11 | −8.56637E−11 |
| C37 | $X^8$ | | 1.47968E−12 | 1.09094E−12 |
| C38 | $X^7Y$ | | 1.81553E−12 | 3.77892E−13 |
| C39 | $X^6Y^2$ | | −3.00409E−13 | 3.05178E−12 |
| C40 | $X^5Y^3$ | | −4.61107E−14 | −2.30189E−12 |
| C41 | $X^4Y^4$ | | 1.09241E−12 | −2.06982E−12 |
| C42 | $X^3Y^5$ | | −1.56574E−14 | −7.73312E−13 |
| C43 | $X^2Y^6$ | | 6.04551E−12 | 3.61288E−12 |
| C44 | $XY^7$ | | 1.80863E−13 | 7.39563E−14 |
| C45 | $Y^8$ | | −1.61149E−12 | −1.54184E−12 |
| C46 | $X^9$ | | −6.00019E−15 | 4.68892E−15 |
| C47 | $X^8Y$ | | 2.02853E−14 | 2.70576E−14 |
| C48 | $X^7Y^2$ | | 4.26901E−14 | 1.88520E−14 |
| C49 | $X^6Y^3$ | | 7.56454E−15 | 6.45243E−14 |
| C50 | $X^5Y^4$ | | −2.53738E−16 | 6.86799E−15 |
| C51 | $X^4Y^5$ | | 7.17209E−15 | −1.45366E−14 |
| C52 | $X^3Y^6$ | | −2.56593E−15 | −1.50111E−14 |
| C53 | $X^2Y^7$ | | 4.16227E−14 | 1.72732E−14 |
| C54 | $XY^8$ | | −2.98638E−15 | −3.57456E−15 |
| C55 | $Y^9$ | | −2.60489E−15 | −3.35263E−15 |

Figure 6:
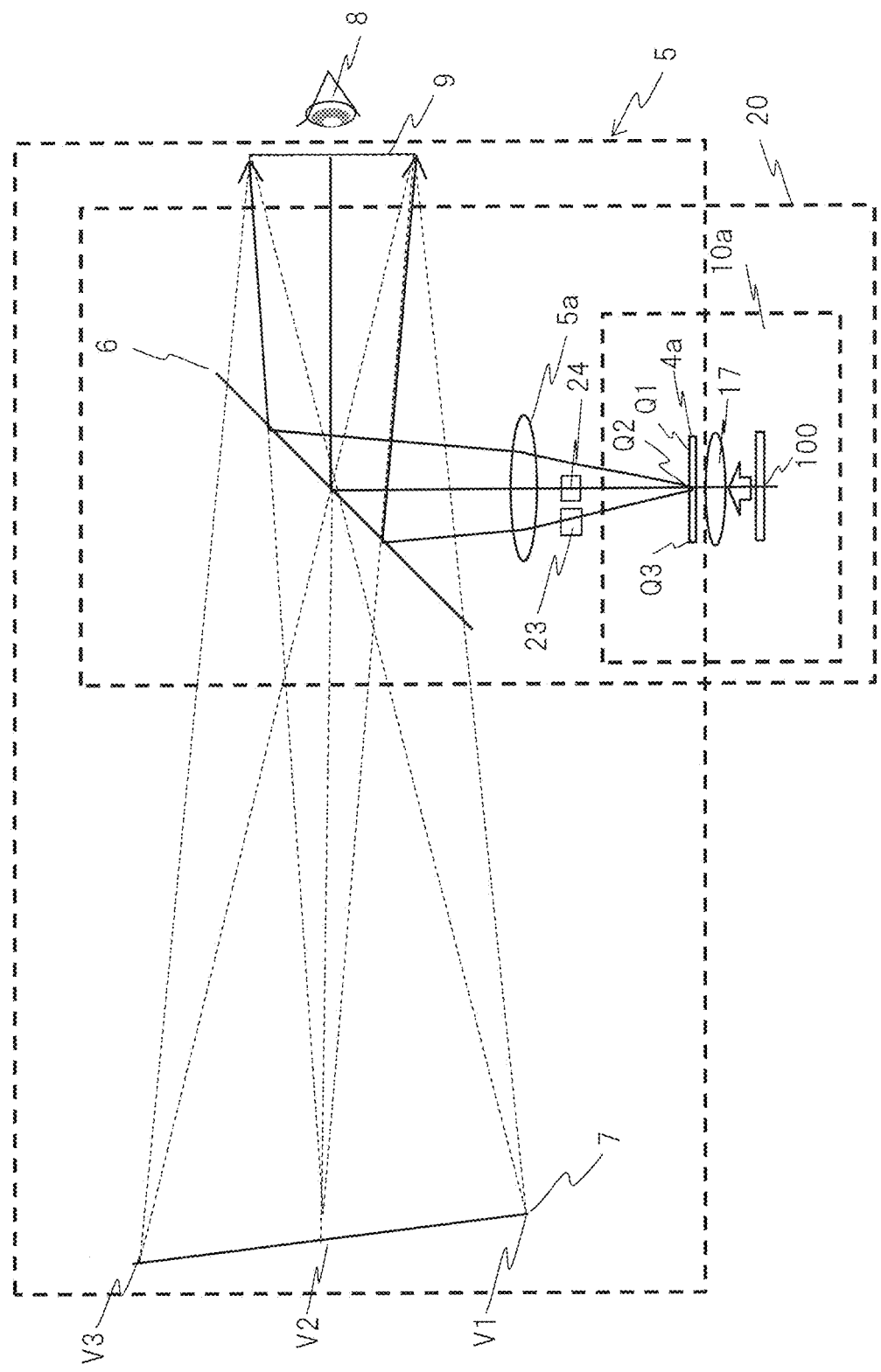
FIG. 6 is a schematic configuration diagram illustrating an example of a virtual image optical system in the information display device according to the one embodiment of the present invention.

Table 1 is a table indicating the lens data of the video image projection device 11 according to the first embodiment of the present invention. In the lens data indicated in Table 1, the curvature radius is represented by a positive sign in a case where the center position of the curvature radius is in a traveling direction. An inter-plane distance represents a distance on the optical axis from an apex position of a plane to the other apex position of the next plane. For example, at a virtual image distance of 18 m, a thickness of the stepped filter corresponding to an optical element 23 illustrated in FIG. 6 is 27.439 mm. At a virtual image distance of 30 m, a thickness of the stepped filter corresponding to an optical element 24 illustrated in FIG. 6 is 14.556 mm. At a virtual image distance of 100 m, a thickness of the stepped filter is 0 mm.

In addition, eccentricity is a value in a Y-axis direction, and tilt is a rotation about an X axis in the YZ plane. Eccentricity and tilt act on a corresponding plane in order of eccentricity and tilt. For "normal eccentricity," the next plane is disposed at a position of the inter-plane distance on a new coordinate system where eccentricity and tilt have acted. Eccentricity and tilt of decenter and return act only on the subject plane and do not affect the next plane.

A glass material name of PMMA indicates a plastic acrylate (polymethyl methacrylate), and a glass material name of 58.3 indicates a material having a refractive index of 1.58 and an Abbe number of 30.

Table 2 is a table indicating free-form surface coefficients of the lens data of the video image projection device 11 according to the first embodiment of the present invention. The free-form surface coefficients of Table 2 are obtained by the following equation (Expression 1).

$$Z = \frac{c \cdot (x^2 + y^2)}{1 + \sqrt{1 - (1+K)c^2 \cdot (x^2 + y^2)}} + \sum \sum (Cj(m,n) \times x^m \times y^n)$$ [Expression 1]

A free-form surface coefficient $C_j$ represents a shape which is rotationally asymmetrical with respect to each optical axis (Z axis) and which is defined by components of conic terms and XY polynomial terms. For example, in a case where X is a second power term (m=2) and Y is a third power term (n=3), the free-form surface coefficient corresponds to the coefficient of $C_{19}$ given by j={$(2+3)^2$+2+3×3}/2+1=19. In addition, a position of the optical axis of each free-form surface is determined by an amount of eccentricity and tilt in the lens data of Table 1.

In addition, an anamorphic aspherical coefficient of the video image projection device 11 according to the first embodiment of the present invention is obtained by the following equation (Expression 2). As for "cuy" (=1/rdy) and "cux" (=1/rdx) in (Expression 2), rdy is 9686 mm and rdx is 5531 mm in Table 1, and the other coefficients are all set to 0.

$$Z = \frac{cux \cdot x^2 + cuy \cdot y^2}{1 + \sqrt{1 - (1+Kx)cux^2 \cdot x^2 - (1+Ky)cuy^2 \cdot y^2}}$$ [Expression 2]

In addition, in the following, an eye-box size of the eyepiece optical system constituting the virtual image optical system 5 according to the first embodiment of the present invention, and values such as a field-of-view angle will be shown in order of the horizontal direction and the vertical direction.

Eye-box size: 100×50 mm
Effective size of the video image light in a screen plate: 40.70×18.80 mm
Field-of-view angle (entire angle of view): 5.4×1.8 degrees
Separated optical path (vertical field-of-view direction, virtual image size, virtual image distance)
 1.8 to 2.2 degrees, 1698×126 mm, 18 m
 1.1 to 1.5 degrees, 2830×210 mm, 30 m
 0.4 to 0.8 degrees, 9432×698 mm, 100 m Next, an optical performance (especially, a distortion performance) of the virtual image optical system 5 in the first embodiment described above will be described with reference to FIG. 19 to FIG. 21.

FIG. 19 and FIG. 20 are diagrams each illustrating a distortion performance of the virtual image optical system 5 in the video image projection device 11 according to the first embodiment of the present invention. FIG. 21 is a spot diagram of the eyepiece optical system in the video image projection device 11 according to the first embodiment of the present invention.

FIG. 19 is a diagram illustrating a distortion performance of each separated optical path in the first embodiment on virtual image planes 71, 72, and 73 illustrated in FIG. 15 described above. It can be seen from the drawing that a rectangular virtual image is achieved on each of the virtual image planes. When the field-of-view angles are calculated from the virtual image sizes of the virtual image planes 71, 72, and 73, a horizontal field-of-view angle (entire angle of view) of a field-of-view range F1 is 2×tan(1698/2/18000)= 5.4 degrees, a horizontal field-of-view angle (entire angle of view) of a field-of-view range F2 is 2×tan(2830/2/30000)= 5.4 degrees, and a horizontal field-of-view angle (entire angle of view) of a field-of-view range F3 is 2×tan(9432/2/100000)=5.4 degrees. In FIG. 20, since the field-of-view angles of the virtual image planes 71, 72, and 73 in the horizontal direction are the same, the field-of-view ranges of the virtual image planes 71, 72, and 73 are collectively illustrated. However, it can be seen that the field-of-view ranges F1, F2, and F3 are displayed at positions shifted in the vertical direction.

FIG. 21 illustrates a spot diagram in which object points are disposed on the virtual image planes 71, 72, and 73 and a spot diagram on a screen plate 4 is calculated, and a favorable optical performance is achieved. Note that the spot diagram is a spot diagram in an entire light flux in which the size of an eye box 9 is 100 mm in a horizontal direction×50 mm in a vertical direction. A spot diagram in the size of the irises of the eyes of a person (which is said to be a maximum of ϕ7 mm) is more significantly improved than that in FIG. 21 in the case of a virtual image viewed by an actual driver.

Therefore, according to the present embodiment, it is possible to provide an information display device capable of simultaneously displaying virtual images at different virtual image distances in different field-of-view directions by a virtual image optical system using a free-form surface lens and a free-form surface mirror.

In general, as illustrated in FIGS. 24(a) to 24(c), a driver checks a preceding vehicle (turning-on of brake lamps and right-turn/left-turn lamps), a road surface of the forward road (e.g., presence/absence of falling objects) and further checks a bicycle and a pedestrian at the edge of the forward road in driving. According to the present embodiment, it becomes possible to display information calling for attention related to the preceding vehicle in a virtual image range corresponding to the position of the preceding vehicle and to display presence/absence of falling objects in the corresponding virtual image range at the position of the road surface of the forward road. Further, according to the present embodiment, it is possible to simultaneously display video images on a plurality of virtual image planes which are positioned in different field-of-view directions and at different virtual image distances, respectively.

In addition, the driver also checks information such as a speed meter and a fuel gauge, and information of various meters can be displayed as the virtual images in front of the driver by mounting the information display device. Therefore, movement of a line-of-sight direction of the driver can be smaller, and a time taken for the eyes to be focused can also be reduced, so that driving safety can be improved.

By the way, the preceding vehicle in the foreground, the forward road surface therein, and the bicycle and the pedestrian at the edge of the forward road are different in distance from the driver. Therefore, when a distance of a virtual image displaying the relevant information is changed, it is possible to further reduce a time taken for the eyes to be focused. In addition, driving safety can be further improved.

Next, a mapping relation by difference in virtual image distance of the information display device is organized with reference to FIGS. 23 to 25, and problems to be solved will be shown in a quantitative manner.

FIG. 23 is a diagram illustrating a mapping relation between an object distance and an image distance (in a real image optical system). When a distance L from an image-forming lens 201 to an object plane 202 is reduced, a distance a to a real image plane 203 is increased. FIG. 24 is a diagram illustrating the mapping relation in the real image optical system and a function of a stepped filter and indicates a movement amount δ at a focal position at a focal distance of 440 mm and at an object distance L of 100 to 10 m. In the real image optical system, the focal position on a short distance side is farther apart from the focal position on a long distance side. Herein, when a filter 251 having a refractive index N with a thickness d is disposed between the image-forming lens 201 and the real image plane 203, the position of the real image plane 203 can be made apart by d (1−1/N) which is a difference between a physical length d and an optical length d/N of the filter 251. In the real image optical system, the real image plane position on the short distance side is farther apart from the real image plane position on the long distance side. Therefore, the filter 251 is disposed between the image-forming lens 201 and the real image plane 203 on the optical path of the long distance side, so that the physical real image plane position on the short distance side and the physical real image plane position on the long distance side can be disposed on the same plane.

Similarly, FIG. 25 is a diagram illustrating a mapping relation in a virtual image optical system and a function of a stepped filter, and indicates a movement amount δ at an object position at the focal distance of 440 mm and at a virtual image distance L of 100 to 10 m. In the virtual image optical system, the object position on the long distance side is farther apart from than the object position on the short distance side. Similarly, when a filter 351 having a refractive index N with a thickness d is disposed between an eyepiece lens 301 and an object plane 302, the position of the object plane 302 can be made apart by d (1−1/N) which is a difference between the physical length d and the optical length d/N of the stepped filter 351. In the virtual image optical system, the object plane position on the long distance side is farther apart from the object plane position on the short distance side. Therefore, the filter 351 is disposed between the eyepiece lens 301 and the object plane 302 on the optical path on the short distance side, so that the physical object plane position on the short distance side and the physical object plane position on the long distance side can be disposed on the same plane. For example, in a case where the virtual image distance L is 20 to 10 m, the position of the object plane 302 is shifted by δ=9.1 mm. Thus, the filter 351 satisfying d=δ/(1−1/N)=26.6 mm is required. Similarly, in a case where the virtual image distance L is 100 to 18 m, the position of the object plane 302 is shifted by δ=8.6 mm. Thus, the filter 351 satisfying d=25.2 mm is required.

Second Embodiment

Next, a basic structure of an optical system of the information display device of a second embodiment of the present invention will be described with reference to FIG. 5. The optical system illustrated in FIG. 5 includes an image forming unit 10 and an eyepiece optical system 5a constituting the above-described virtual image optical system 5. In other words, the optical system has a configuration in which video image light emitted from a projection optical system 20 is reflected on a windshield 6 of an automobile (not illustrated) and is thus incident on eyes 8 of a driver.

More specifically, a light flux irradiated from a backlight 100 to a liquid crystal display panel 2 is incident on a relay optical system as a video image light flux including video image information to be displayed in a liquid crystal display panel 2. An image is formed by a relay optical system 3, and the video image information on the liquid crystal display panel 2 is enlarged and is then projected onto an intermediate-image forming section 4 in an enlarged manner. Points P1, P2, and P3 on the liquid crystal display panel 2 correspond to points Q1, Q2, and Q3 on the intermediate-image forming section 4, respectively. With use of the relay optical system 3, a liquid crystal display panel of small display size can be used. The backlight 100, the liquid crystal display panel 2, the relay optical system 3, and the intermediate-image forming section 4 form the image information (video image information) on the intermediate-image forming section 4, and accordingly, they are collectively called the image forming unit 10.

Next, the image information on the intermediate-image forming section 4 is projected onto the windshield 6 by the eyepiece optical system 5a, and the light flux reflected on the windshield 6 reaches the position of the eyes 8 of the observer. When viewed from the eyes of the observer, a relation holds as if the observer viewed the image information of a virtual image plane 7. The points Q1, Q2, and Q3 on the intermediate-image forming section 4 correspond to points V1, V2, and V3 of the virtual image plane 7, respectively. Note that a range where the points V1, V2, and V3 on the virtual image plane 7 can be viewed even if the position of the eyes 8 is moved is a so-called eye box 9. Thus, the virtual image optical system of the present invention is an optical system capable of displaying an object (spatial image) and an image (virtual image) in front of the eyes of the observer similarly to the eyepiece lens of a finder of a camera or the eyepiece lens of a microscope.

In addition, the intermediate-image forming section 4 is configured by a microlens array in which microlenses are disposed in a two-dimensional shape. That is, its diffusion function allows a divergence angle of a light flux emitted from the intermediate-image forming section 4 to increase. Thus, the eye box 9 is set to be a predetermined size. Note that the diffusing function of the intermediate-image forming section 4 can be achieved by containing diffusing particles.

Figure 5:
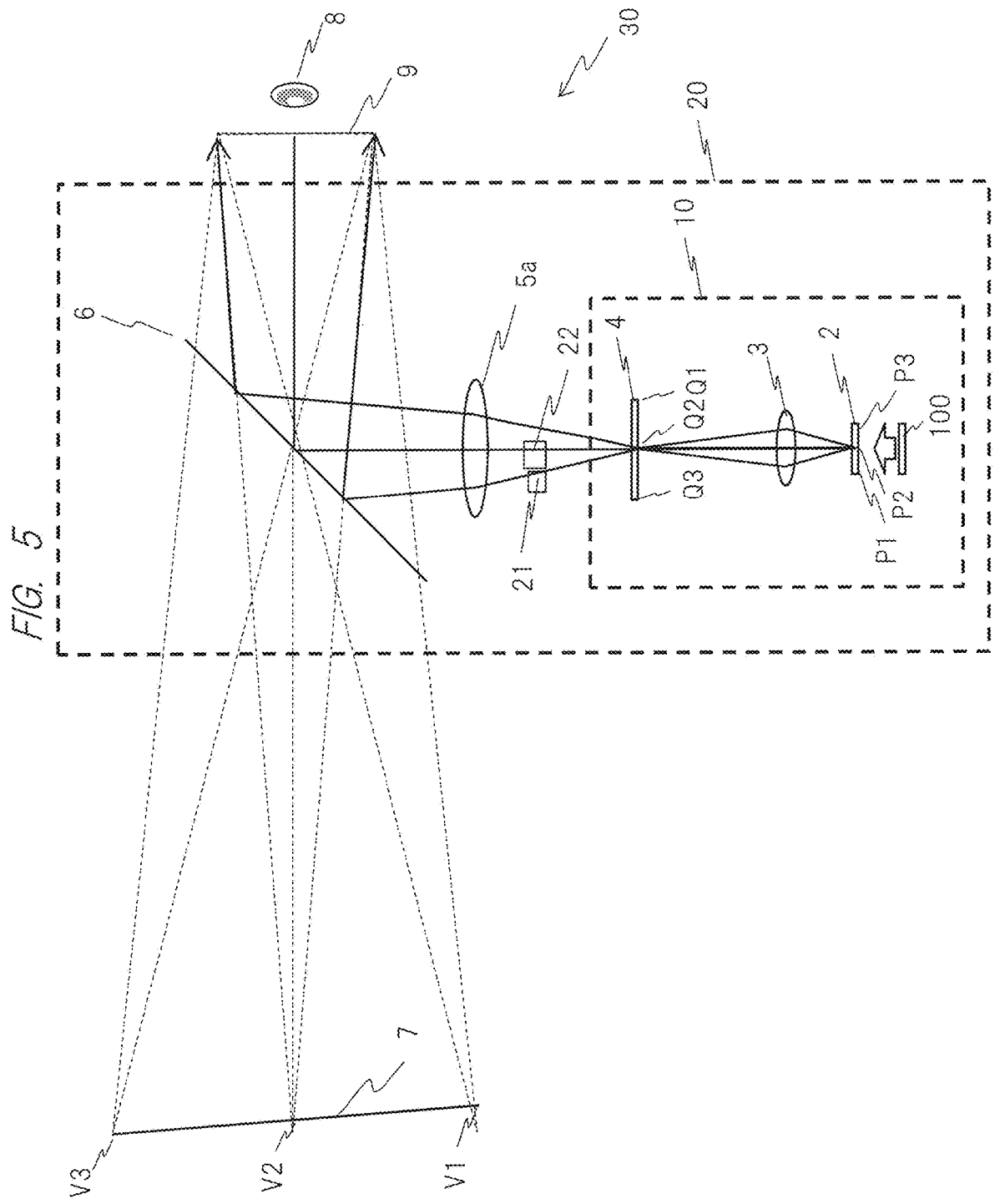
FIG. 5 is a schematic configuration diagram illustrating a virtual image optical system in the information display device according to the one embodiment of the present invention.

In addition, in the second embodiment of the present invention, as illustrated in FIG. 5, an optical element for aberration correction is disposed to correspond to a generation position of a virtual image between the intermediate-image forming section 4 and the eyepiece optical system 5a constituting the virtual image optical system 5. More specifically, an optical element 21 for correction is disposed at a position through which the light flux corresponding to a nearest position V1 passes, and the virtual image generation position in the virtual image optical system 5 is brought close thereto, to achieve a low magnification, and at the same time to reduce distortion and aberration occurring in the virtual image. Then, an optical element for correction 22 is arranged at a position through which a light flux corresponding to the virtual image V2 established at an intermediate position passes, and the virtual image generation position in the virtual image optical system 5 is established at the intermediate position, to achieve a middle magnification, and at the same time to reduce distortion and aberration occurring in the virtual image. Then, the eyepiece optical system 5a constituting the virtual image optical system 5 is optimally designed such that the optical element for correction described above need not be disposed at a position through which a light flux corresponding to the virtual image V3 established farthest from a monitoring person passes.

In this way, such a structure in which the eyepiece optical system 5a is optimally designed for the virtual image V3 established farthest to be a reference while the optical elements for correction are respectively arranged for the virtual image V2 established at an intermediate distance and the virtual image V1 established near becomes optimal in order to not only reduce an optical distance between the intermediate-image forming section 4 and the eyepiece optical system 5a, but also correct distortions and aberrations in the virtual images established at the respective image positions.

In addition, to reduce the distortions and the aberrations of the virtual images, a plurality of intermediate-image forming sections may be used (a similar effect is obtained by division), and may be respectively arranged at optimal positions for the eyepiece optical system 5a to match positions of the virtual images. In this case, when a direction of the intermediate-image forming section is directed in an entrance pupil direction of the eyepiece optical system 5a, video image light can be more efficiently incident on the eyepiece optical system 5a.

Description has been given regarding the present embodiment as respectively arranging, at positions where a light flux corresponding to the virtual image V1 established near, a light flux corresponding to the virtual image V2 intermediately established, and a light flux corresponding to the virtual image V3 established far are separated and incident on the virtual image optical system 5 (illustrated as positions between an eyepiece optical system and a flat display in FIGS. 5 and 6), optical systems for correction to correspond to the virtual images, to correct distortions and aberrations of the virtual images. However, the present invention is not limited to only this. Even if positions where the virtual images are established are continuous from a far position to a near position, for example, an optical element for correction may be arranged by changing an optical distance between the virtual image optical system 5 and the intermediate image forming section 4 so as to correspond to the respective establishment positions of the virtual images. It is needless to say that this does not depart from the technical idea or the scope of the present invention.

Third Embodiment

Next, an optical system in an information display device according to a third embodiment of the present invention will be described below with reference to FIG. 6.

In an example illustrated in this drawing, a flat display (e.g., a liquid crystal display panel) 4a is used as a video image source. A light flux irradiated from a backlight 100 is incident on an eyepiece optical system 5a constituting a virtual image optical system 5 as a video image light flux including video image information displayed on the liquid crystal display panel 4a. An optical element for aberration correction is arranged to correspond to a generation position of a virtual image between the liquid crystal display panel 4a and the eyepiece optical system 5a constituting the virtual image optical system 5, like in the above-described second embodiment. More specifically, an optical element for correction 23 is arranged at a position through which a light flux corresponding to a virtual image V1 positioned nearest passes, to bring the virtual image generation position in the virtual image optical system 5 close to a near position, and at the same time to reduce distortion and aberration occurring in the virtual image. Then, an optical element for correction 24 is arranged at a position through which a light flux corresponding to a virtual image V2 established at an intermediate position passes, to establish the virtual image generation position in the virtual image optical system 5 at an intermediate position to achieve a middle magnification, and at the same time to reduce distortion and aberration occurring in the virtual image. Meanwhile, the eyepiece optical system 5a constituting the virtual image optical system 5 is optimally designed such that an optical element for correction may not be arranged at a position through which a light flux corresponding to a virtual image V3 established farthest from a monitoring person passes.

Also in the third embodiment, the virtual image optical system 5 is optimally designed for the virtual image V3 established farthest from the monitoring person to serve as a design standard of the virtual image optical system 5, and optical elements for correction are respectively arranged for the virtual image V2 established at an intermediate distance and the virtual image V1 established near, like in the above-described second embodiment. Thus, an optical distance between the flat display 4a and the eyepiece optical system 5a can be made to correspond each position of the virtual image, and thus, a structure most optimal to correct respective distortions and aberrations in the virtual images established at their positions is obtained.

Figure 7:
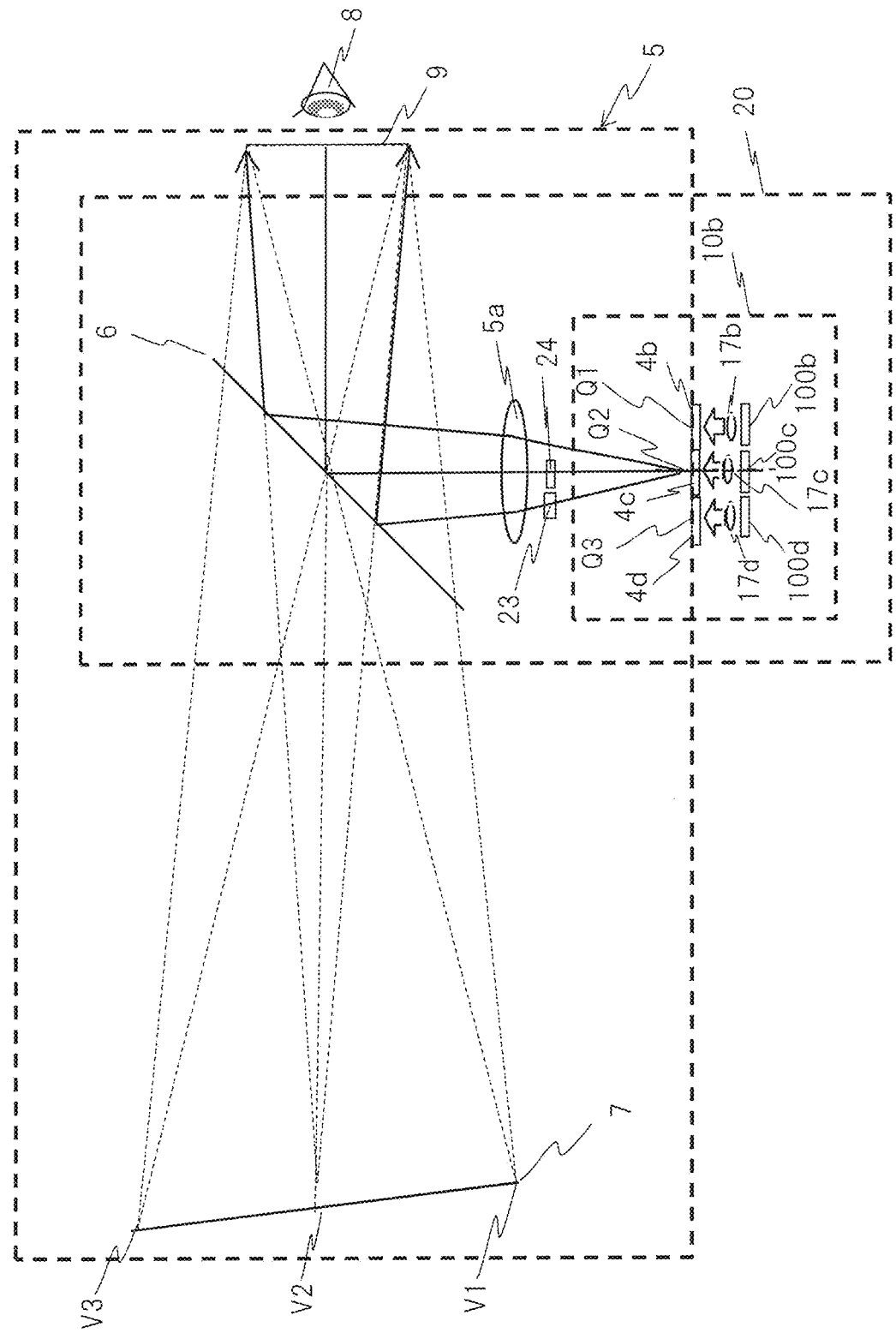
FIG. 7 is a schematic configuration diagram illustrating an example of a virtual image optical system in the information display device according to the one embodiment of the present invention.

FIG. 7 illustrates an example in which a plurality of flat displays (e.g., liquid crystal display panels) 4b, 4c, and 4d are each used as a video image source. Light fluxes irradiated from backlights 100b, 100c, and 100d are incident on a virtual image optical system 5a, respectively, as video image light fluxes including video image information displayed on the liquid crystal display panels 4b, 4c, and 4d. Respective functions of the virtual optical system 5a and optical elements for correction corresponding to virtual images V3, V2, and V1 are similar to those in the second embodiment illustrated in FIG. 6 described above, and description thereof is omitted herein.

Figure 8:
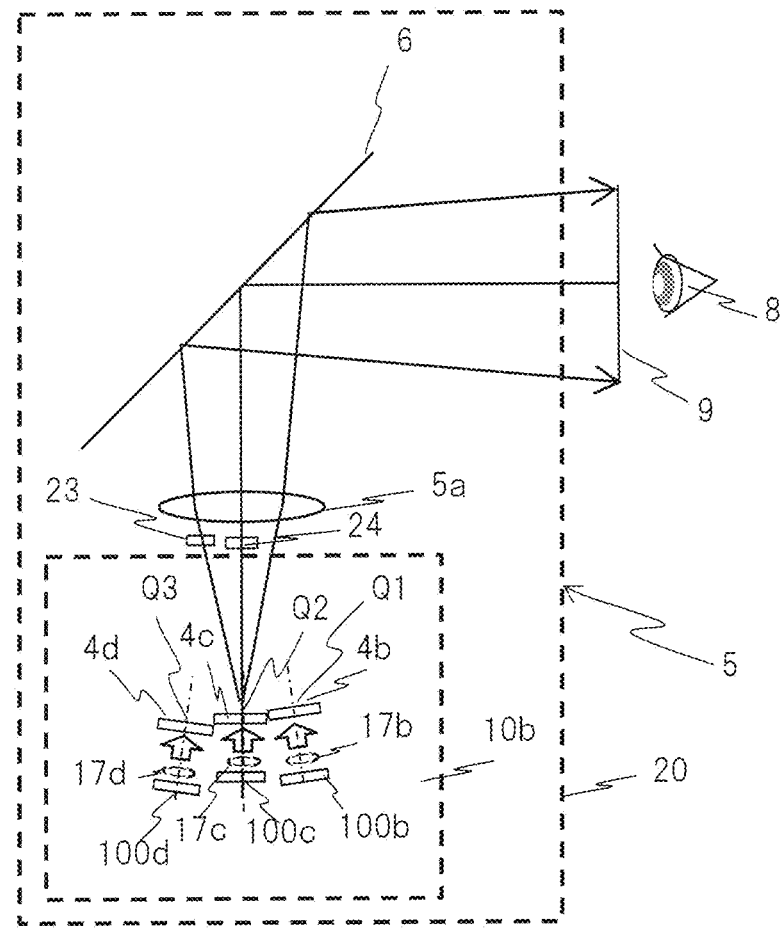
FIG. 8 is a schematic configuration diagram illustrating an example of a virtual image optical system in the information display device according to the one embodiment of the present invention.

FIG. 8 illustrates another example in which a plurality of flat displays (e.g., liquid crystal display panels) 4b, 4c, and 4d are each used as a video image source. Light fluxes irradiated from backlights 100b, 100c, and 100d are incident on an eyepiece optical system 5a, respectively, as video image light fluxes including video image information displayed on the liquid crystal display panels 4b, 4c, and 4d. Note that, in this example, video image light can be more efficiently taken in by inclining the flat displays in an entrance pupil direction of the eyepiece optical system 5a, as it is apparent from the drawing. Note that respective functions of optical elements for correction corresponding to virtual images V3, V2, and V1 are similar to those in the second embodiment illustrated in FIG. 6 described above, and description thereof is omitted herein.

Specific effects obtained by using the plurality of flat displays (liquid crystal display panels) described above, are summarized below.

Figure 4:
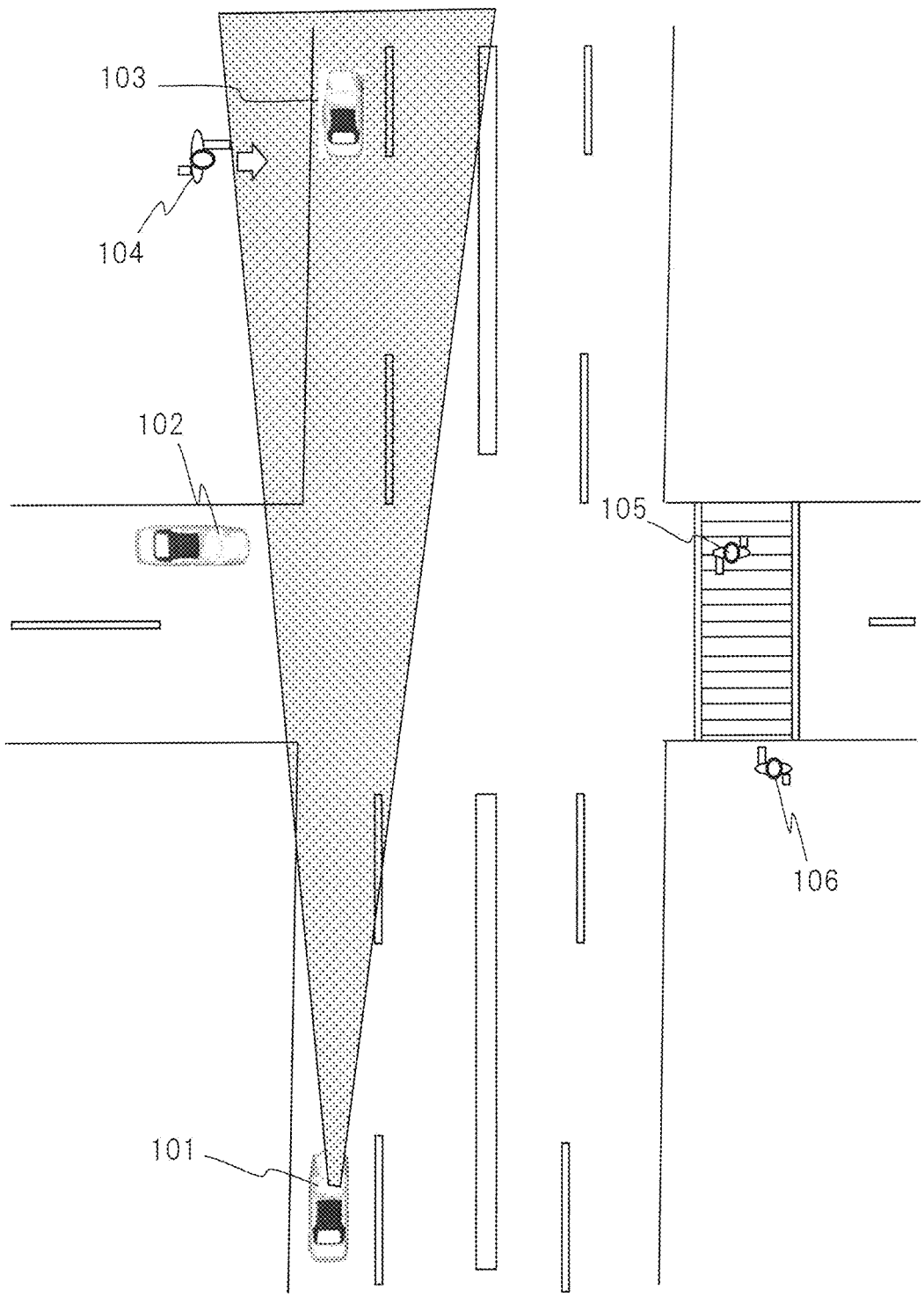
FIG. 4 is a schematic configuration diagram illustrating a region which a driver watches in driving in the one embodiment of the present invention.

(1) A composite resolution can be increased by respectively using the plurality of liquid display panels as video image sources. As a result, an information amount of an entire virtual image can be increased. Thus, a virtual image can be established over an almost entire region of the windshield 6, as illustrated in FIG. 3 described above. Note that, usually, the virtual image is not established on an entire surface of the windshield 6 but is established in an image display region 1(*a*), an image display region 1(*c*), or both the image display regions 1(*a*) and 1(*c*) in the drawing. As a result, as illustrated in FIG. 4 described above, video image information and information calling for attention from a peripheral monitoring device also illustrated in FIG. 1 described above, further information from a navigation system, and the like can be displayed so as to overlap with a forward field of view which a driver of a running vehicle 101 watches in driving, and so-called virtual reality can be achieved. Further, even when the driver attempts to turn right, information about a pedestrian to be a safety problem in running is recognized by the peripheral monitoring device, and then, displaying information calling for attention so as to overlap with video image information which has been captured provides effective assistance for safe driving.

In addition, if a safety problem occurs for a vehicle 102 which is running from the left in a traveling direction, intermittently displaying a video image calling for attention in the image display region 2 illustrated in FIG. 3 described above helps safety recognition of the driver to be enhanced, for example.

(2) When the plurality of flat displays (liquid crystal display panels) are respectively arranged at desired positions within an object plane range of a virtual image optical system, an establishment position and a magnification of a virtual image to be obtained can be controlled, as needed.

(3) When respective directions of the liquid crystal display panels are further inclined in an entrance pupil direction of the eyepiece optical system 5a, use efficiency of video image light can be improved, so that a bright virtual image can be obtained. Similarly, at positions where the liquid crystal display panels are respectively arranged, the liquid crystal display panels are inclined to be advantageous in correcting aberrations and distortions in respective virtual images to be established, so that a degree of freedom for design can be improved.

Figure 9:
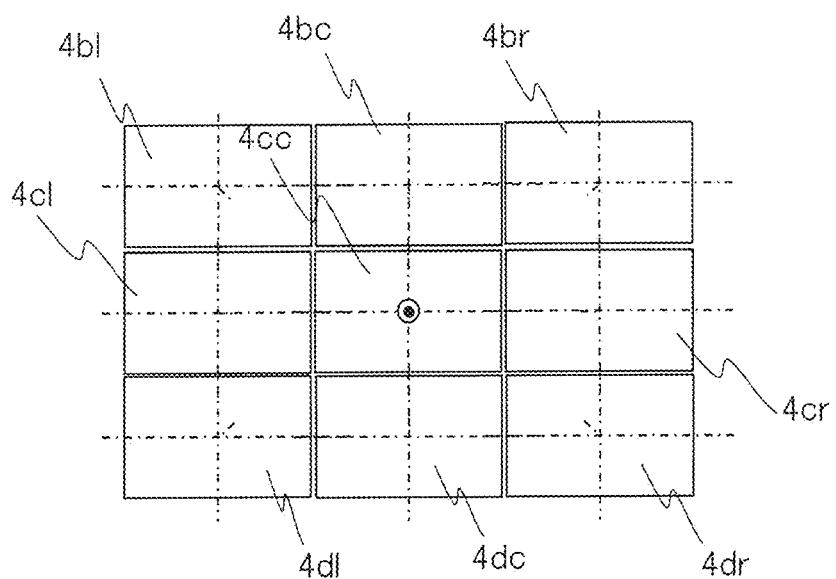
FIG. 9 is a configuration diagram illustrating an arrangement of a video image projection device in the information display device according to the one embodiment of the present invention.

As a result, the degree of freedom for design is more increased than that in the above-described virtual image optical system 5 illustrated in FIG. 6. Therefore, a resolution performance and a degree of freedom for aberration correction and distortion correction can be improved, and a virtual image can be established at a desired position when viewed from a driver's point of view. In FIG. 7 described above, by way of example, an example in which the three liquid crystal display panels 4b, 4c, and 4d are arranged in parallel is illustrated. However, the present invention is not limited to this. The liquid crystal display panels may be respectively inclined and arranged to correspond to an optical axis direction of the eyepiece optical system 5a, as illustrated in FIG. 8, for example. Alternatively, the flat displays may be arranged in a matrix shape, as illustrated in FIG. 9. Further, it is needless to say that the above-described optical element for correction may be inserted. At this time, improving a degree of freedom for distortion correction and aberration correction by inclining each of the panels to an optical axis of a virtual image optical system is also similarly effective.

Other Embodiments

Figure 10:
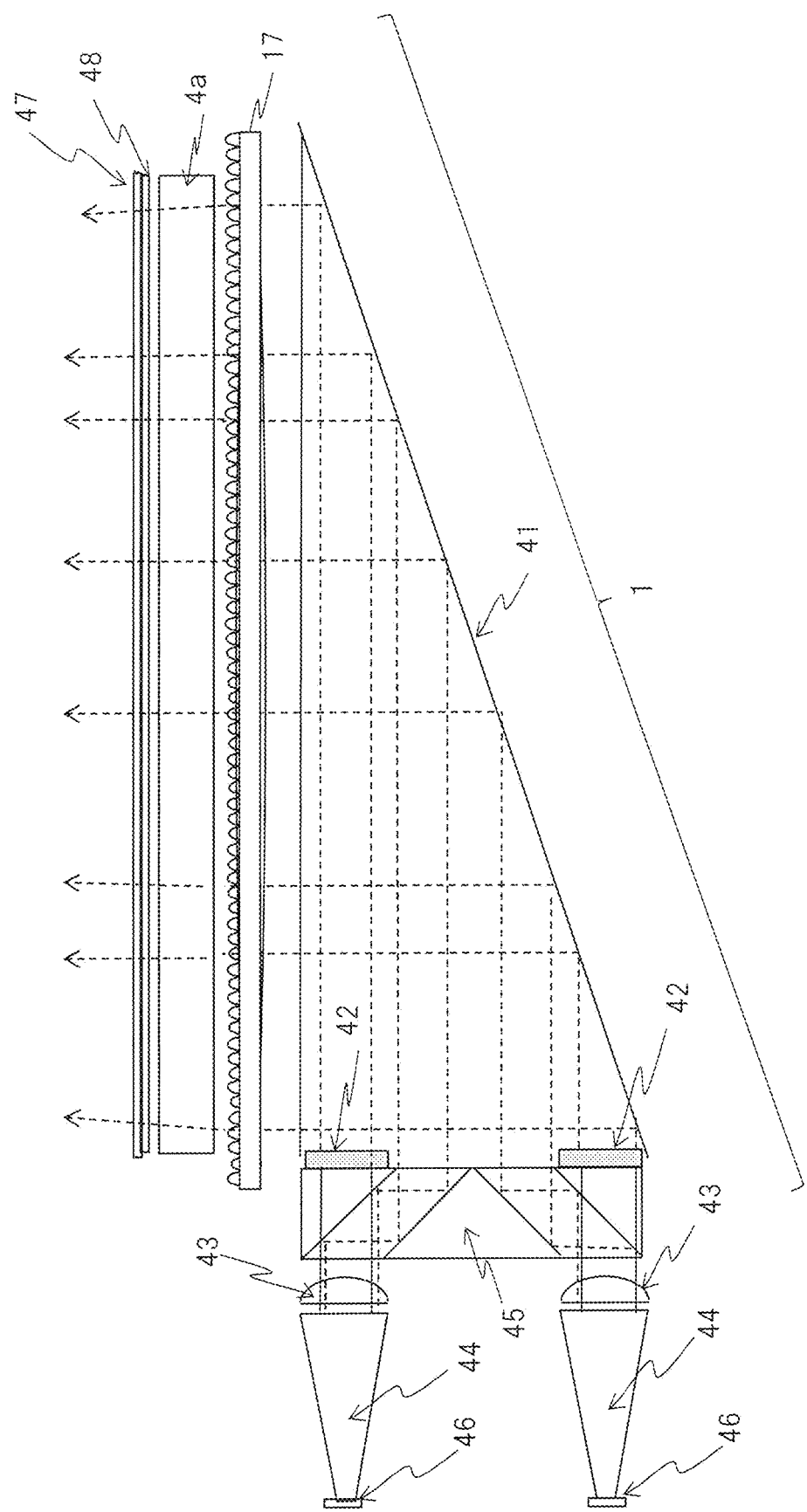
FIG. 10 is a cross-sectional view illustrating an outline of an entire structure of the information display device according to another embodiment of the present invention.

FIG. 10 is a cross-sectional view illustrating an outline of an entire structure including a liquid crystal display panel 4a and a backlight 100 as a video image light source in an information display device according to another embodiment of the present invention. A divergence angle of emitted light from a white LED 46 serving as a solid light source is reduced by a light funnel 44, and an intensity distribution of the emitted light is equalized. Then, the emitted light is changed to substantially parallel light by an optical element 43 and is aligned with a single polarized wave in a PBS 45 for polarization conversion. Then, the emitted light is reflected on a reflection surface 41, and is incident on the liquid crystal display panel 4a. At this time, an optical element 17 for controlling a light flux incident angle on a liquid crystal display panel 4a is provided such that a video image light flux obtained by the liquid crystal display panel 4a becomes excellent in contrast performance.

Accordingly, polarizing plates are respectively provided on a light incidence surface and an emission surface of the liquid crystal display panel 4a, so that a video image light flux excellent in contrast performance can be obtained. Further, a λ/4 plate 46 is provided on the emission surface of the liquid crystal display panel 4a, so that the emitted light can also be changed to circularly polarized light. As a result, a driver can monitor a favorable virtual image even if he/her wears polarized sunglasses.

As described above, in order to obtain a video image of a bright virtual image by using the liquid crystal display panel 4a which uses a polarized light as the video image light source, for example, base materials of the free-form surface mirror 56 and the cylinder mirror 55 which form the eyepiece optical system 5a (an enlarged perspective view of the lens portion is illustrated in FIG. 17) constituting the virtual image optical system 5 according to the first embodiment described above are formed by heating a plastic molded mirror or a glass plate to be compressed, so that a shape accuracy of each reflection surface is secured, and each front surface is coated with a reflective film. At this time, in order to obtain a bright virtual image, it is required to increase a reflectance of the reflective film.

Figure 12:
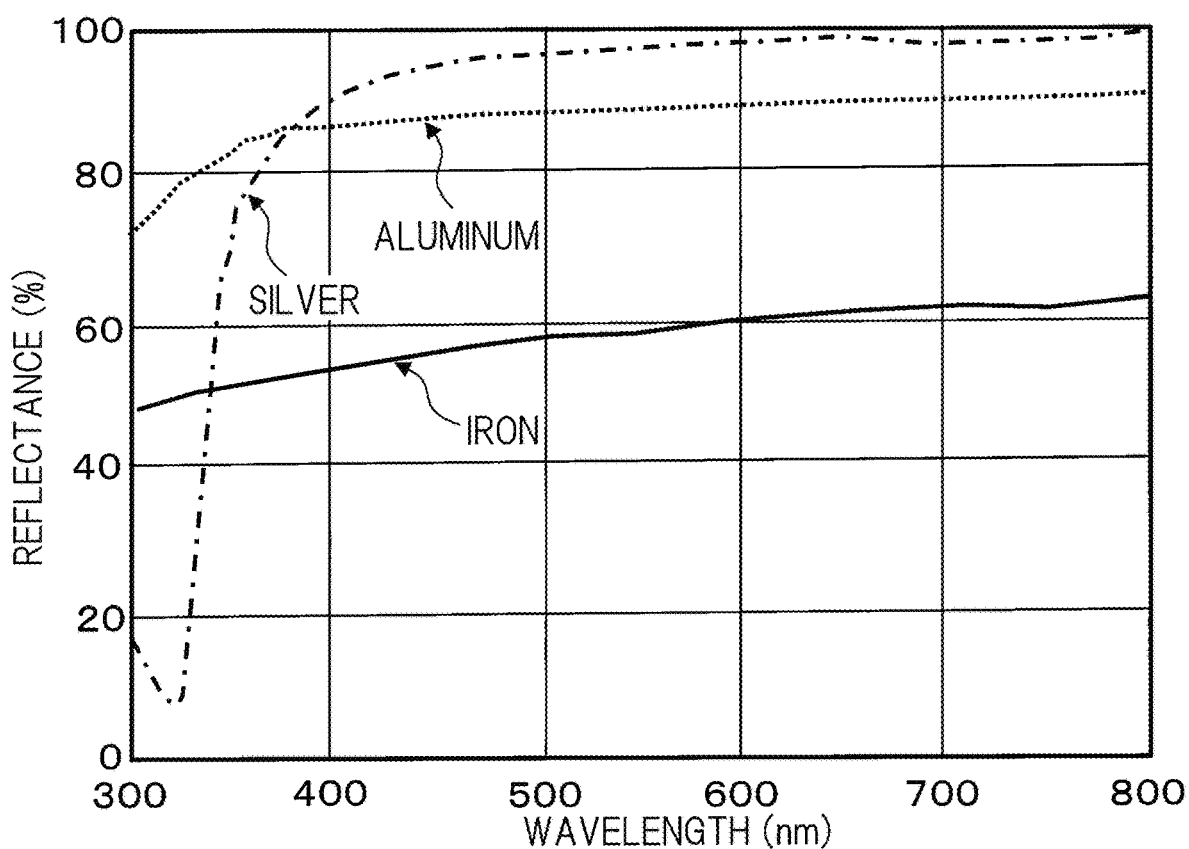
FIG. 12 is a characteristic diagram illustrating a spectral reflectance of a metal reflective film of an embodiment of the present invention.

At this time, in order to secure uniformity in brightness and chromaticity of the obtained virtual image, (1) a high spectral reflectance in a visible light region (380 nm to 780 nm) and (2) constant reflectance characteristics are important. FIG. 12 illustrates spectral reflectance characteristics of typical metals. As an example of metal for satisfying the above two conditions, silver is most excellent.

However, since silver has problems in endurance (the reflectance is significantly lowered due to changing into a compound) and costs, modification is added, and at present, a silver alloy reflective film having an excellent endurance is commercially used.

Figure 11:
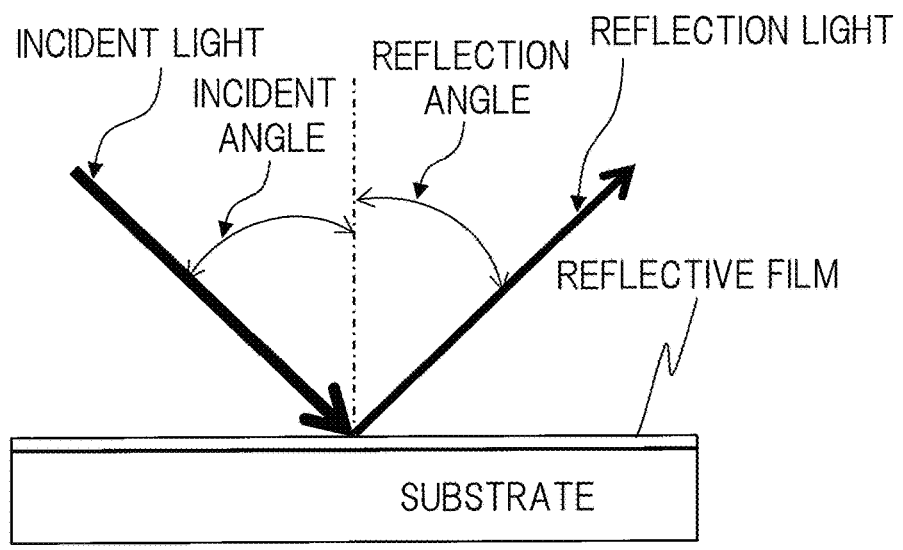
FIG. 11 is a cross-sectional view for describing a reflection on a mirror surface of an embodiment of the present invention.

Other excellent characteristics of the silver or the silver alloy reflective film are, as illustrated in FIGS. 11 and 12, that a reflectance of the reflective film obtained by forming a silver or a silver alloy film on a base material has a small incident angle dependence and has a small wavelength dependence caused by P and S waves as well. Therefore, in a case where the liquid crystal display panel is used as the video image light source of the present embodiment and a specific polarized wave is used, the S polarized light is used. As a result, reflectance of the S polarized light is high, so that a bright and favorable virtual image can be obtained.

Figure 13:
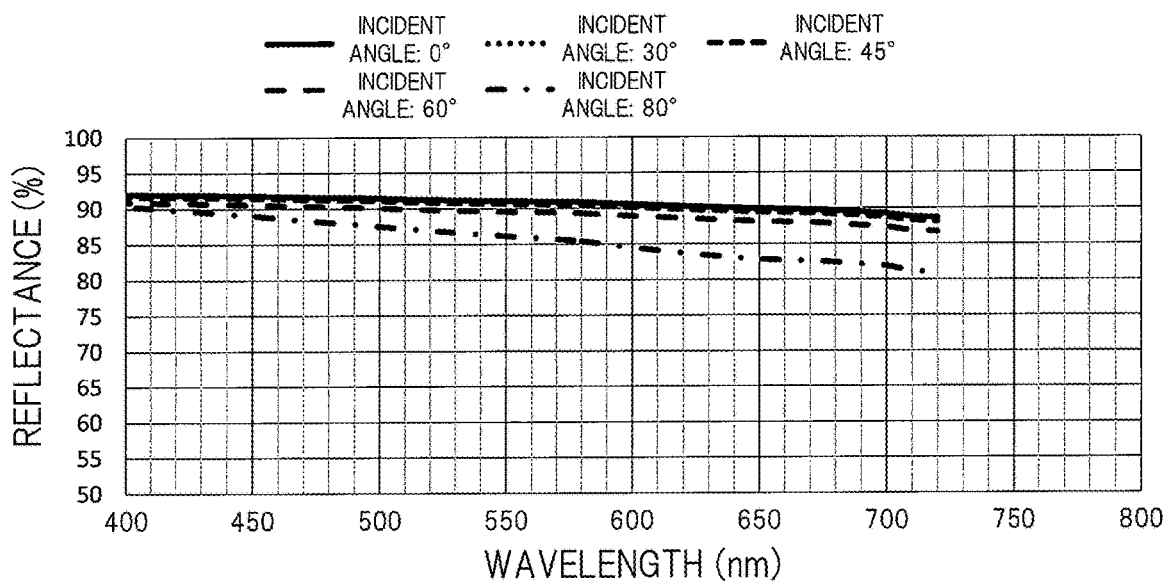
FIG. 13 is a characteristic diagram illustrating a spectral reflectance in a case where a single-layer reflection enhancing film is formed on an aluminum film of an embodiment of the present invention.

Meanwhile, in order to reduce the costs of the reflective film, aluminum is used as the reflective film, and providing a reflection enhancing film which improves reflectance due to an interference effect of light on a front surface of the aluminum reflective film has been widely performed in recent years. FIG. 13 illustrates a spectral reflectance in a case where a single-layer reflection enhancing film is formed on the front surface of the aluminum reflective film. Compared to the reflectance of aluminum illustrated in FIG. 12, the reflectance in the visible light region can be improved by substantially 5% by providing a single-layer reflection enhancing film in the case of vertical incidence (incident angle of 0 degrees), while the single-layer reflection enhancing film has the incident angle dependence, the wavelength dependence, and the polarization dependence (reflectance of the S polarized wave is different from reflectance of the P polarized wave, and the reflectance of the S polarized wave is higher) of the reflectance.

Figure 14:
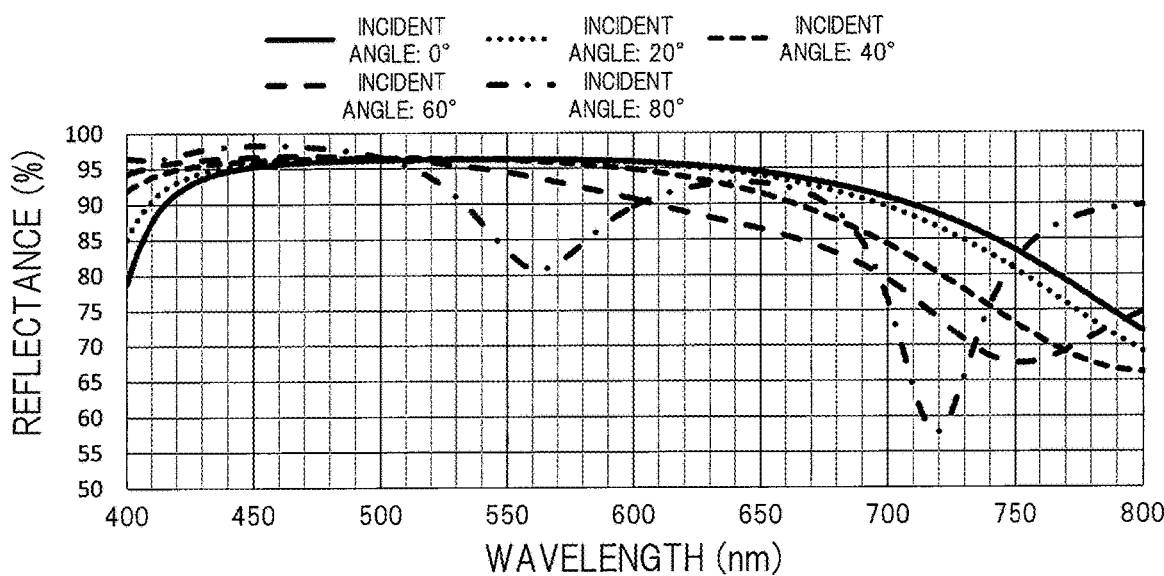
FIG. 14 is a characteristic diagram illustrating a spectral reflectance in a case where a five-layer reflection enhancing film is formed on an aluminum film of an embodiment of the present invention.

The characteristics in a case where the number of reflection enhancing films is set to five layers in order to further increase the reflectance are illustrated in FIG. 14. The reflectance is further improved by substantially 3% in the case of the vertical incidence, compared to the characteristics of the single-layer reflection enhancing film illustrated in FIG. 13. However, since a wavelength region where this reflectance is maintained becomes a narrow band and the incident angle dependence is still further increased, it is required to design the system while controlling an incident angle of a light ray onto the mirror in order to obtain desired reflection characteristics and obtain uniform brightness and single-color reproducibility over the entire display screen region.

As described above, the reflective film formed on the mirror may be a reflective film made of silver or a silver alloy having small wavelength dependence, small angle dependence, and small dependence on polarized waves.

Meanwhile, in order to reduce the costs, it is required to form the reflection enhancing film on the aluminum reflective film to increase the reflectance. At this time, as illustrated in FIGS. 13 and 14, since the reflectance has the incident angle dependence and the wavelength dependence, there is no practical problem as long as the incident angle of the video image light onto the mirror is equal to or less than 60 degrees. As long as the incident angle is equal to or less than 40 degrees, it is possible to achieve uniform brightness and chromaticity over the entire screen region of the obtained virtual image.

Alternatively, as illustrated in FIG. 10, the λ/4 plate 46 is provided on the emission surface of the liquid crystal display panel 4a, and the emitted light is set to be a circularly polarized light, so that the polarization dependence (the reflectance of the S polarized wave is different from the P polarized wave, and the reflectance of the S polarized wave is higher) may be reduced.

Further, when an ultraviolet reflecting film or an optical member 47 formed by combining the ultraviolet reflecting film and an infrared reflecting film is provided at a position closest to the virtual image optical system 5, even if an external light (solar light) is incident, the liquid crystal display panel and the polarization plate can be protected by decreasing temperature rising and damage. Therefore, an effect that the reliability of the information display device is not degraded can be obtained.

<Others>

Although respective principal configurations of the information display devices according to the embodiments of the present invention have been described in detail above, the configurations will be further collectively described below, and details of other configurations will also be described.

First, examples of a video image projection device among them include flat displays such as a single plate LCOS (Liquid Crystal On Silicon) equipped with a color liquid crystal panel of a TFT (Thin Film Transistor) type and a color filter and an OLED (Organic Light Emitting Diode). Meanwhile, for a video image source (an intermediate-image display section), there is a method of modulating intensity of light in accordance with a video image signal by a video image display element such as a small-sized liquid crystal panel or DMD (Digital Mirror Device) and enlarging and projecting the modulated light on the intermediate-image display section by projection means. In addition thereto, when light source light is scanned by a microscopic mirror in MEMS (Micro Electro Mechanical Systems), similar video image information to that in the above-described video image projection device can be obtained. Therefore, a best image plane of the projection means and a video image plane obtained by scanning are made to substantially match a planar shape of the intermediate-image display section, and a degree of freedom for design of a virtual image optical system can also be increased as a spherical surface, an aspherical surface, or a free-form surface, for example, other than a planar surface. Also, a plurality of intermediate-image display sections may be installed to divide and display a video image (note that the intermediate-image display sections are displayed as one intermediate-image display section in FIGS. 1 and 5).

Also, the virtual image optical system is optimally designed, including a difference between a curvature radius in a horizontal direction and a curvature radius in a vertical direction of a vehicle of a windshield serving as a member to be projected in a conventional technique, and a concave mirror having a concave surface directed toward the windshield is arranged between the windshield and the video image projection device or the intermediate-image display section. Thus, a video image enlarged and projected onto the video image projection device or the intermediate-image display section is enlarged to be reflected on the windshield. At this time, a plurality of optical elements are arranged between the above-described concave mirror and the video image projection device or the intermediate-image display section. Meanwhile, a video image light flux forming an enlarged image (virtual image) of the video image formed to correspond to a viewpoint position of a driver passes through each of the plurality of optical elements arranged between the concave mirror and the video image projection device or the intermediate-image display section. In the case, the video image light flux passes through each of the optical elements respectively arranged at positions separate from one another. Therefore, when the optical elements are separated to correspond to respective light fluxes to perform optimum aberration correction, virtual images having high visibility respectively corresponding to a plurality of viewpoint positions of the driver can be obtained.

In addition, when a plurality of small-sized video image display elements are arranged to constitute a video image projection device, as also illustrated in FIG. 7 described above, a high resolution can be achieved at low cost. Further, when places where the plurality of video image display elements are respectively arranged are changed for the above-described virtual image optical system, a generation position and a magnification of a virtual image in a case where the virtual image is viewed from a driver can be controlled.

More specifically, according to the present invention, a virtual image, which is obtained by being reflected on an upper portion of a windshield (an upper portion in a vertical direction of a vehicle body), needs to be formed farther. Thus, in order to favorably form a video image light flux dispersed from an upper portion of a video image projection device or an intermediate-image display section on which a video image corresponding to the virtual image is to be displayed, a plurality of optical elements arranged between the above-described concave mirror and the video image projection device or the intermediate image display section reduce a composite focal distance f1 or increase an optical distance L1 by inserting an optical member having a refractive index of 1.0 or more. In contrast, in order to form a virtual image, which is obtained by being reflected on a lower portion of the windshield (a lower portion in the vertical direction of the vehicle body), nearer, a composite focal distance f2 needs to be increased or an optical distance L2 needs to be reduced. In other words, a relation therebetween may be set to satisfy f1<f2. In order to achieve an object of the present invention, necessary information may be displayed by dividing the video image projection device and the intermediate-image display section into some portions, as described above. Alternatively, continuous information display can also be performed.

Further, in the one embodiment of the present invention illustrated in FIG. 1, a virtual image V3, which is obtained by being reflected on an upper portion of a windshield (an upper portion in a vertical direction of a vehicle body), needs to be formed farther. Thus, in order to favorably form a video image light flux dispersed from an upper portion of a video image projection device or an intermediate-image display section on which a video image corresponding to the virtual image is to be displayed, a composite focal distance f1 of a plurality of optical elements arranged between the above-described concave mirror and the video image projection device or the intermediate image display section may be set short. In contrast, a virtual image V1, which is obtained by being reflected on a lower portion of the windshield (a lower portion in the vertical direction of the vehicle body), needs to be formed nearer. Thus, in order to favorably form a video image light flux dispersed from a lower portion of the video image projection device or the intermediate-image display section on which a video image corresponding to the virtual image is to be displayed, a composite focal distance f2 of a plurality of optical elements arranged between the above-described concave mirror and the video image projection device or the intermediate-image display section may be set relatively long.

Also, in the one embodiment of the present invention, a curvature radius in a horizontal direction (parallel to the ground) of a windshield and a curvature radius in a vertical direction of the windshield (a direction perpendicular to the horizontal direction of the windshield) differ from each other. Thus, optical elements, which differ in axial symmetry with respect to an optical axis, are arranged in a virtual image optical system to correct a screen distortion in a virtual image to be viewed by a driver, and accordingly, the above-described distortion correction is achieved.

Then, in the one embodiment of the present invention, a video image plane is configured as a flat panel display. Specific examples are flat displays such as a single plate LCOS (Liquid Crystal On Silicon) equipped with a color liquid crystal panel of a TFT type or a color filter and an OLED (Organic Light Emitting Diode). A display screen size is preferably from substantially 1 inch to 5 inches and is preferably up to substantially 3 inches, considering effective utilization of video image light. Also, as illustrated in FIG. 7, a desired resolution can also be obtained by using a plurality of small-sized flat displays in combination.

In this case, since a video image projection device itself becomes a video image source of a virtual image optical system, a display surface becomes a planar surface. Therefore, as a degree of freedom for design, there exists a degree of freedom for correcting a trapezoidal distortion in consideration of a slope of a windshield to be inclined with respect to an optical axis of the virtual image optical system. Further, in an information display device using a plurality of flat displays, a generation position and a magnification of a virtual image described above can also be similarly controlled by changing respective places where the small-sized flat displays are arranged for the virtual image optical system.

Also, an optical element having a light collecting function is arranged between a video image plane and a virtual image optical system such that a video image light flux reaches a viewpoint position of a driver, and light rays emitted from the video image plane are made to efficiently reach the eyes of the driver through the virtual image optical system. Also, in a video image projection device using only specific polarized light, such as a single plate LCOS (Liquid Crystal On Silicon) equipped with a color liquid crystal panel of a TFT type or a color filter or an OLED (Organic Light Emitting Diode), when an optical element which polarizes and converts light source light to extract only a desired polarized wave component is provided between a light source and the video image projection device, the light source light can be effectively utilized. Further, when a divergence angle of the light source light is controlled to use only an angle component having high contrast performance, of light outputted from the above-described video image projection device, contrast performance of a video image can also be enhanced.

Also, on a reflection surface of a windshield, respective center positions of a curvature radius in a vehicle body vertical direction and a curvature radius in a vehicle body horizontal direction of the windshield and a position of the eyes of the driver are different in a case where a plurality of viewpoint positions of the driver exist by changing the driver, for example. Thus, distortions of images obtained in virtual images differ, respectively. Therefore, in order to measure the viewpoint position of the driver within an automobile, for example, a position of the pupils of the driver may be measured by using a camera or the like, and a display image on a video image projection device may be distorted in advance so as to correct distortion occurring in the virtual image.

Further, a distortion of a displayed character or figure caused by a shape of the reflection surface of the windshield and the viewpoint positions of the driver, described above, is corrected by changing an aspect ratio of the character or the figure depending on a position of the display image, so that a shape of a virtual image viewed by the driver can be represented more naturally (at a more correct aspect ratio).

As a result of the foregoing, in the information display device according to the one embodiment of the present invention, virtual images having high visibility can be respectively formed at a plurality of viewpoint positions (different distances) of the driver. Further, the information display device according to the one embodiment of the present invention can be achieved in a simpler configuration than in techniques disclosed in Patent Document 1 and Patent Document 2 described above, that is, a device structure can be prevented from being increased in size and complicated as much as possible.

Also, in the information display device according to the one embodiment of the present invention, a focal distance of the projection means need not be adjusted at high speed in accordance with each image forming means, and virtual images can be respectively formed at positions adapted to a line of sight of a driver, for example, a short distance (corresponding to a lower portion of a windshield) and a long distance (corresponding to an upper portion of the windshield) by a low-cost and simple configuration, as compared with the technique described in Patent document 2 described above. As a result, there can be provided an information display device excellent in usability for a user.

EXPLANATION OF REFERENCE CHARACTERS

1 . . . information display device, 100 . . . backlight, 2 . . . liquid crystal display panel, 3 . . . relay optical system, 4 . . . intermediate-image forming section (diffusion plate), 5a . . . eyepiece optical system (optical part), 5 . . . virtual image optical system, 6 . . . member to be projected (windshield), 7 . . . virtual plane, 8 . . . eye box, 9 . . . eyes of an observer, 10 . . . image forming unit, 11 . . . video image projection device, 17 . . . optical element, 20 . . . projection optical system, 21 . . . optical element, 22 . . . optical element, 23 . . . optical element, 41 . . . reflection surface, 42 . . . λ/2 plate, 43 . . . optical element, 44 . . . light funnel, 45 . . . PBS, 46 . . . solid light source, 47 . . . ultraviolet and infrared reflecting sheet, 48 . . . λ/4 plate, 51 . . . optical element (stepped filter), 52 . . . convex lens (first optical element), 53 . . . concave lens (second optical element), 54 . . . free-form surface lens, 55 . . . cylinder mirror (reflection mirror), 56 . . . free-form surface mirror (reflection mirror, concave mirror), and V1, V2, and V3 . . . virtual image.

The invention claimed is:

1. A head-up display device comprising:
a display element displaying video image information; and
a virtual image optical system displaying a virtual image in front of a vehicle as viewed from a driver's point of view by reflecting image light emitted from the display element on a glass of the vehicle,
wherein the virtual image optical system includes: a concave mirror disposed on an optical path of the image light and between the display element and the glass; and an optical element disposed on the optical path and between the display element and the concave mirror,
wherein the optical element is disposed such that each virtual image of a plurality of virtual images is established at a plurality of positions which include a distal position, an intermediate position and a proximal position as viewed from the driver's point of view, and such that light flux of the virtual image corresponding to the distal position, the intermediate position and the proximal position respectively differ in distance regarding the optical path passing therethrough, and
wherein the virtual image optical system further includes a cylinder mirror, disposed on the optical path, between the display element and the concave mirror, and behind the optical element.

2. The head-up display device according to claim 1, wherein the optical element includes: a first portion having a first thickness for establishing a first virtual image to be formed at the proximal position; a second portion having a second thickness for establishing a second virtual image to be formed at the intermediate position; and a third portion having no thickness for establishing a third virtual image to be formed at the distal position.

3. The head-up display device according to claim 1, wherein, in the virtual image optical system, a first lens having a positive refractive power and a second lens having a negative refractive power are independently disposed in this order in a direction from the display element to the concave mirror, on the optical path, between the display element and the concave mirror, and behind the optical element.

4. The head-up display device according to claim 1, wherein the display element displays the video image information as a plurality of video image information on a plurality of divided regions or a plurality of display elements so as to correspond to the plurality of virtual images.

5. The head-up display device according to claim 1, wherein the head-up display device further detects a position of the driver's point of view, and corrects an image of the video image information on the display element such that distortion of the virtual image is corrected in accordance with the detected position of the driver's point of view.

6. The head-up display device according to claim 1, wherein the display element includes a light source including: a solid light source; an optical element reducing a divergence angle of diverging light from the solid light source; an optical member polarizing and converting the diverging light, the divergence angle of which is reduced by the optical element; and an illumination light source section allowing light in a desired polarization direction to be incident on the display element.

7. The head-up display device according to claim 1, wherein a $\lambda/4$ plate is provided on a side of the virtual image optical system of the display element.

8. The head-up display device according to claim 1, wherein an optical member reflecting an ultraviolet ray, an infrared ray, or both is provided on a side of the virtual image optical system of the display element.

* * * * *